US012557110B2

(12) United States Patent
Yoshioka et al.

(10) Patent No.: US 12,557,110 B2
(45) Date of Patent: Feb. 17, 2026

(54) USER EQUIPMENT AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 276 days.

(21) Appl. No.: 17/606,650

(22) PCT Filed: Apr. 30, 2019

(86) PCT No.: PCT/JP2019/018173
§ 371 (c)(1),
(2) Date: Oct. 26, 2021

(87) PCT Pub. No.: WO2020/222265
PCT Pub. Date: Nov. 5, 2020

(65) Prior Publication Data
US 2022/0217764 A1 Jul. 7, 2022

(51) Int. Cl.
*H04W 72/23* (2023.01)
*H04W 72/20* (2023.01)

(52) U.S. Cl.
CPC .......... *H04W 72/23* (2023.01); *H04W 72/20* (2023.01)

(58) Field of Classification Search
CPC ..... H04W 72/23; H04W 72/20; H04W 28/04; H04W 92/18; H04W 4/40; H04W 4/46; H04L 1/1854; H04L 1/188; H04L 1/1822; H04L 1/1893
See application file for complete search history.

(56) References Cited

U.S. PATENT DOCUMENTS

| | | | |
|---|---|---|---|
| 2014/0068115 A1 * | 3/2014 | Saeki | G06F 13/28 710/24 |
| 2015/0327315 A1 | 11/2015 | Xue et al. | |
| 2019/0268795 A1 * | 8/2019 | Wu | H04W 24/10 |
| 2020/0092692 A1 * | 3/2020 | Wang | H04W 76/14 |
| 2020/0213901 A1 * | 7/2020 | Yoshimoto | H04L 5/0048 |
| 2020/0221489 A1 * | 7/2020 | Babaei | H04W 72/20 |
| 2020/0366421 A1 * | 11/2020 | Tang | H04L 1/1816 |
| 2021/0068115 A1 * | 3/2021 | Gotoh | H04W 72/0453 |
| 2021/0376959 A1 * | 12/2021 | Yang | H04L 1/1896 |
| 2022/0232620 A1 * | 7/2022 | Lee | H04L 1/1867 |
| 2022/0353021 A1 * | 11/2022 | Park | H04W 72/53 |

(Continued)

FOREIGN PATENT DOCUMENTS

CN 110971355 A * 4/2020 .............. H04L 1/18

OTHER PUBLICATIONS

International Search Report issued in PCT/JP2019/018173 on Jun. 18, 2019 (5 pages).

(Continued)

*Primary Examiner* — Sudesh M. Patidar
(74) *Attorney, Agent, or Firm* — Osha Bergman Watanabe & Burton LLP

(57) ABSTRACT

A user equipment includes a transmitting unit that transmits data using a resource specified by a sidelink grant set in advance and a receiving unit that receives a sidelink grant for retransmission of the data. The transmitting unit retransmits the data based on the sidelink grant for the retransmission.

4 Claims, 15 Drawing Sheets

(56) References Cited

U.S. PATENT DOCUMENTS

2022/0353026 A1* 11/2022 Yeo ...................... H04L 5/0007
2023/0363051 A1* 11/2023 Liu ................... H04W 52/0248

OTHER PUBLICATIONS

Written Opinion of the International Searching Authority issued in PCT/JP2019/018173 on Jun. 18, 2019 (5 pages).
3GPP TS 36.321 V15.5.0; "3rd Generation Partnership Project; Technical Specification Group Radio Access Network; Evolved Universal Terrestrial Radio Access (E-UTRA); Medium Access Control (MAC) protocol specification (Release 15)"; Mar. 2019 (131 pages).
CATT; "Early ACK on configured grants with repetitions"; 3GPP TSG-RAN WG2 NR AH-1801, R2-1800216; Vancouver, Canada; Jan. 27-26, 2018 (7 pages).
3GPP TS 38.331 V15.5.1; "3rd Generation Partnership Project; Technical Specification Group Radio Access Network; NR; Radio Resource Control (RRC) protocol specification (Release 15)"; Apr. 2019 (491 pages).
3GPP TS 38.321 V15.5.0; "3rd Generation Partnership Project; Technical Specification Group Radio Access Network; NR; Medium Access Control (MAC) protocol specification (Release 15)"; Mar. 2019 (78 pages).
3GPP TSG RAN WG2 Meeting #105bis; R2-1904159 "SL HARQ operation" Lenovo, Motorola Mobility; Xi'an, China; Apr. 8-12, 2019 (4 pages).
3GPP TSG-RAN WG1 Meeting #96bis; R1-1905476 "Uu-based sidelink resource allocation" Ericsson; Xi'an, China; Apr. 8-12, 2019 (6 pages).
3GPP TSG-RAN WG2 104; R2-1816707 "Configured UL grant enhancement for NR Unlicense" Intel Corporation; Spokane, USA; Nov. 12-16, 2018 (5 pages).
Extended European Search Report issued in European Application No. 19927340.0, dated Oct. 17, 2022 (11 pages).
Ericsson; "Feature lead summary #2 on Resource allocation for NR sidelink. Mode 1"; 3GPP TSG-RAN WG1 Meeting #96bis, R1-1905834; Xi'an, China; Apr. 8-12, 2019 (20 pages).
MediaTek Inc.; "Impact of BWP switch on SPS and configured grants"; 3GPP TSG-RAN WG2 #101bis, R2-1805099; Sanya, China; Apr. 16-20, 2018 (6 pages).
Office Action issued in Japanese Application No. 2021-517133 dated May 9, 2023 (7 pages).
Office Action issued in counterpart Korean Patent Application No. 10-2021-7036986 mailed on Jul. 2, 2024 (10 pages).
Office Action issued in Korean Patent Application No. 10-2021-7036986, issued Apr. 14, 2025 (6 pages).

* cited by examiner

USER EQUIPMENT AND COMMUNICATION METHOD

TECHNICAL FIELD

The present invention relates to a user equipment in a radio communication system.

BACKGROUND ART

In Long Term Evolution (LTE) and a successor system to LTE (for example, LTE Advanced (LTE-A), New Radio (NR) (also referred to as 5G)), Device to Device (D2D) technology for performing direct communication between user equipments without passing through a base station apparatus has been studied.

D2D reduces traffic between a user equipment and a base station apparatus, and enables communication between user equipments even when the base station apparatus cannot communicate therewith during a disaster or the like. In addition, in 3rd Generation Partnership Project (3GPP), D2D is referred to as "sidelink".

D2D communication is classified roughly into D2D discovery for discovering another communicable user equipment and D2D communication (also referred to as D2D direct communication, terminal-to-terminal direct communication, and the like) for direct communication between user equipments. Hereinafter, D2D communication, D2D discovery, and the like are simply referred to as D2D unless otherwise distinguished. In addition, various use cases of services relevant to Vehicle to Everything (V2X) in the NR have been studied.

CITATION LIST

Non-Patent Document

Non-Patent Document 1: 3GPP TS 38.321 V15.5.0 (2019-03)
Non-Patent Document 2: 3GPP TS 38.331 V15.5.1 (2019-04)
Non-Patent Document 3: 3GPP TS 36.321 V15.5.0 (2019-03)

SUMMARY OF THE INVENTION

Problem to be Solved by the Invention

A configured grant in NR-Uu has been introduced that enables a user equipment to perform UL data transmission without receiving a PDCCH every time UL data is transmitted (for example, Non-Patent Documents 1 and 2). In the configured grant in NR-Uu, UL data can be retransmitted by dynamic grant.

For the sidelink, a configured grant has been introduced (Non-Patent Document 3). However, no specific technique for retransmitting data transmitted based on the configured grant has been proposed.

The invention has been made in view of at least the aforementioned point, and it is an object of the invention to provide a technique for realizing retransmission of data transmitted based on a configured grant in sidelink.

Means for Solving Problem

According to the disclosed technique, there is provided a user equipment including: a transmitting unit that transmits data using a resource specified by a sidelink grant configured in advance; and a receiving unit that receives a sidelink grant for retransmission of the data. The transmitting unit retransmits the data based on the sidelink grant for the retransmission.

Effect of the Invention

According to the disclosed technique, a technique for realizing the retransmission of data transmitted based on configured grant in sidelink is provided.

MODE(S) FOR CARRYING OUT THE INVENTION

Hereinafter, an embodiment of the invention will be described with reference to the diagrams. In addition, the embodiment described below is an example, and the embodiment to which the invention is applied is not limited to the following embodiment.

In the actual operation of a radio communication system according to the embodiment of the invention, known technology may be appropriately used. The known technology is, for example, known LTE or NR, but is not limited to the known LTE or NR.

In addition, in the embodiment of the invention, a duplex system may be a Time Division Duplex (TDD) system, a Frequency Division Duplex (FDD) system, or any other system (for example, Flexible Duplex).

Figure 1:
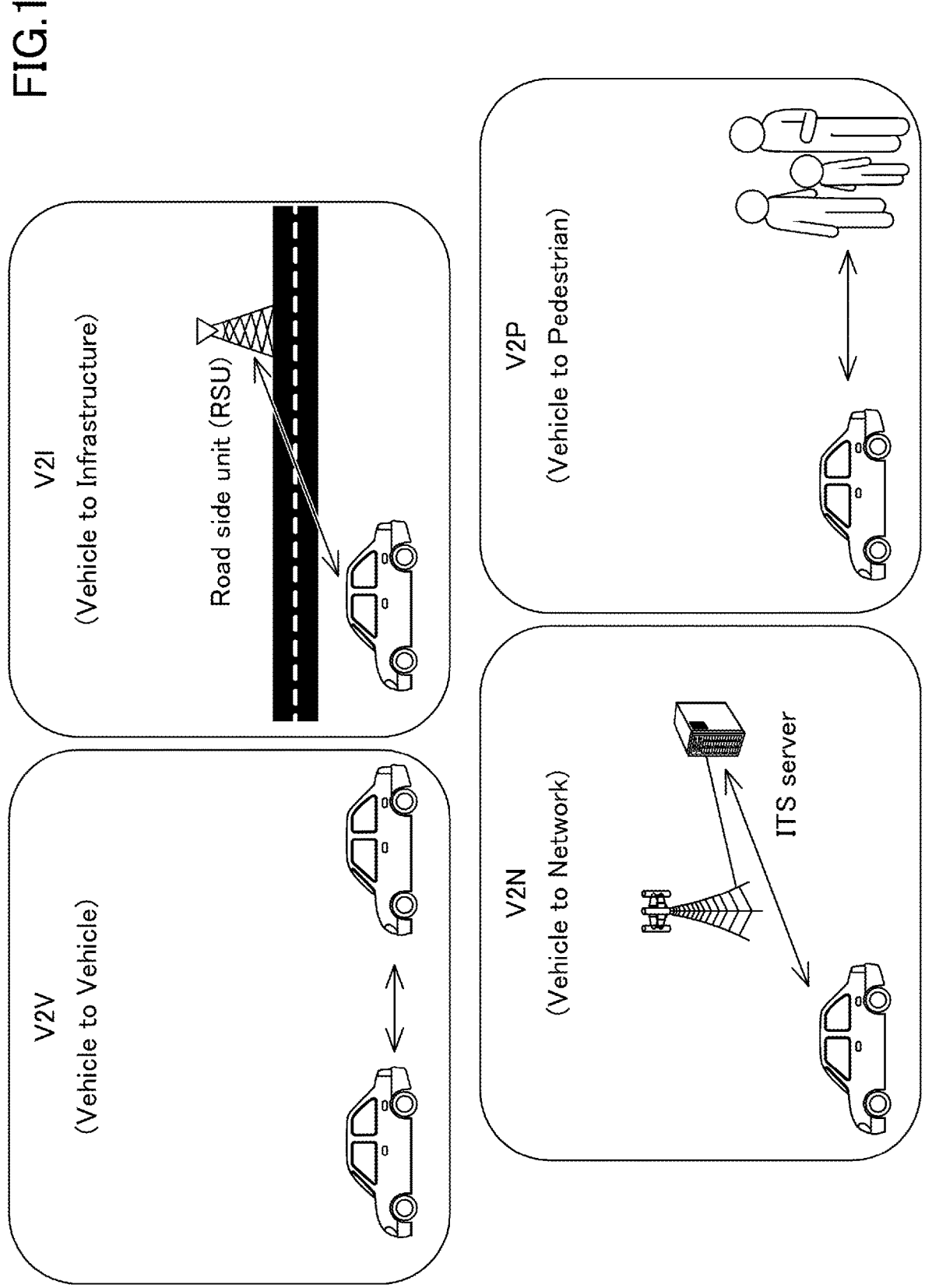
FIG. 1 is a diagram for describing V2X.

FIG. 1 is a diagram for describing V2X. In 3GPP, realizing Vehicle to Everything (V2X) or enhanced V2X (eV2X) by expanding the D2D function has been studied, and the specification is underway. As illustrated in FIG. 1, V2X is a part of Intelligent Transport Systems (ITS), and is a general term for Vehicle to Vehicle (V2V) that means a form of communication performed between vehicles, Vehicle to Infrastructure (V2I) that means a form of communication performed between a vehicle and a road-side unit (RSU) installed on the side of the road, Vehicle to Network (V2N) that means a form of communication performed between a vehicle and an ITS server, and Vehicle to Pedestrian (V2P) that means a form of communication performed between a vehicle and a mobile terminal carried by a pedestrian.

In addition, in 3GPP, V2X using cellular communication and terminal-to-terminal communication in LTE or NR has been studied. V2X using cellular communication is also referred to as cellular V2X. In V2X of NR, studies for realizing large capacity, low delay, high reliability, and Quality of Service (QoS) control are under way.

It is assumed that studies on V2X of LTE or NR, which are not limited to the 3GPP specifications, will be made in the future. For example, it is assumed that ensuring interoperability, reducing costs by implementing higher layers, how to use or switch multiple Radio Access Technologies (RATs), supporting regulations in each country, data acquisition and distribution of V2X platform of LTE or NR, and database management and usage methods will be studied.

In the embodiment of the invention, a form in which a communication device, such as a user equipment (UE), is mounted on a vehicle is mainly assumed, but the embodiment of the invention is not limited to this form. For example, the communication device may be a terminal held by a person, or the communication device may be a device mounted on a drone or an aircraft.

In addition, Sidelink (SL) may be distinguished from Uplink (UL) or Downlink (DL) based on any one or combination of the following 1) to 4). In addition, SL may be another name.
1) Resource allocation in time domain.
2) Resource allocation in frequency domain.
3) Synchronization signal to be referred to (including Sidelink Synchronization Signal (SLSS)).
4) Reference signal used for path loss measurement for transmission power control.

In addition, for Orthogonal Frequency Division Multiplexing (OFDM) of SL or UL, any of Cyclic-Prefix OFDM (CP-OFDM), Discrete Fourier Transform-Spread-OFDM (DFT-S-OFDM), OFDM that is not subjected to Transform precoding, and OFDM that is subjected to Transform precoding may be applied.

Figure 2:
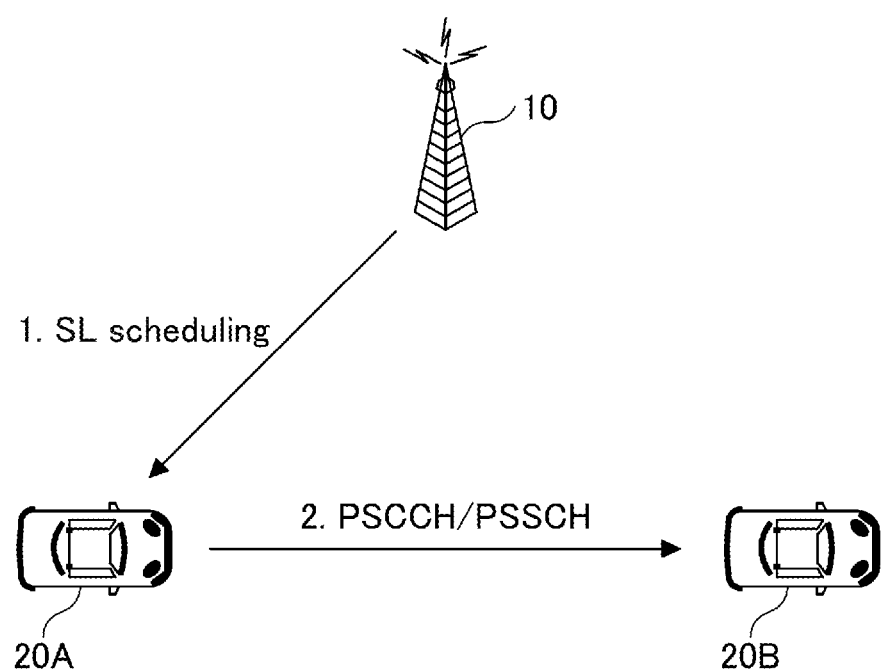
FIG. 2 is a diagram for describing an example (1) of a V2X transmission mode.

The radio communication system according to the present embodiment includes base station apparatus 10 and user equipment 20, as illustrated in FIG. 2 and the like. For the user equipment 20, a plurality of pieces of user equipment 20 that perform sidelink communication therebetween are described as a user equipment 20A, a user equipment 20B, and the like.

The base station apparatus 10 is a communication device that provides one or more cells and performs radio communication with the user equipment 20. The physical resource of a radio signal is defined in a time domain and a frequency domain, and the time domain may be defined by the number of OFDM symbols, and the frequency domain may be defined by the number of subcarriers or the number of resource blocks. In addition, a Transmission Time Interval (TTI) in the time domain may be a slot, or the TTI may be a subframe.

The base station apparatus 10 transmits a synchronization signal and system information to the user equipment 20. The synchronization signal is, for example, PSS and SSS. The system information is transmitted through, for example, a PBCH or a PDSCH, and is also referred to as broadcast information. The base station apparatus 10 transmits a control signal or data to the user equipment 20 by Downlink (DL), and receives a control signal or data from the user equipment 20 by Uplink (UL). In addition, here, a signal transmitted through a control channel, such as a PUCCH or a PDCCH, is called a control signal, and a signal transmitted through a shared channel, such as a PUSCH or a PDSCH, is called data. However, such naming is an example. For example, the control signal and the data may be collectively called a "signal".

The user equipment 20 is a communication device having a radio communication function, such as a smartphone, a mobile phone, a tablet, a wearable terminal, and a communication module for Machine-to-Machine (M2M). In addition, for example, as described above, the user equipment 20 is a communication device mounted on a vehicle.

The user equipment 20 uses various communication services provided by the radio communication system by receiving a control signal or data from the base station apparatus 10 by DL and transmitting a control signal or data to the base station apparatus 10 by UL. In addition, the user equipment 20 may be called a UE, and the base station apparatus 10 may be called a gNB (or an eNB).

In the SL of LTE, sidelink transmission resources can be dynamically allocated by Downlink Control Information (DCI) transmitted from the base station apparatus 10 to the user equipment 20. In addition, Semi Persistent Scheduling (SPS) is also possible. In addition to dynamically receiving the allocation of sidelink transmission resources from the base station apparatus 10, the user equipment 20 can autonomously select a sidelink transmission resource from a resource pool that is a selectable resource set by the base station apparatus 10.

Note that, a slot in the embodiment of the invention may be read as a symbol, a mini-slot, a subframe, a radio frame, and a Transmission Time Interval (TTI). In addition, a cell in the embodiment of the invention may be read as a cell group, a carrier component, a BWP, a resource pool, a resource, a Radio Access Technology (RAT), a system (including a wireless LAN), and the like.

FIG. 2 is a diagram for describing an example (1) of a V2X transmission mode. In the transmission mode of the sidelink communication illustrated in FIG. 2, in step 1, the base station apparatus 10 transmits scheduling information of the sidelink to the user equipment 20A. Then, the user equipment 20A transmits a Physical Sidelink Control Channel (PSCCH) and a Physical Sidelink Shared Channel (PSSCH) to the user equipment 20B based on the received scheduling information (step 2). The transmission mode of the sidelink communication illustrated in FIG. 2 may be called sidelink transmission mode 3 in LTE. In sidelink transmission mode 3 in LTE, Uu-based sidelink scheduling is performed. Uu is a radio interface between Universal Terrestrial Radio Access Network (UTRAN) and User Equipment (UE). The transmission mode of the sidelink communication illustrated in FIG. 2 may be called sidelink transmission mode 1 in the NR. In this case, the above-described Uu becomes NR-Uu, which is a radio interface between the NR and the UE.

Figure 3:
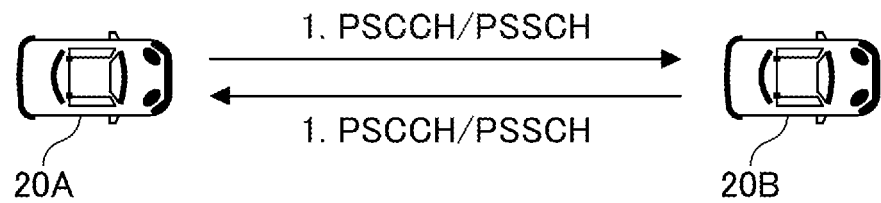
FIG. 3 is a diagram for describing an example (2) of a V2X transmission mode.

FIG. 3 is a diagram for describing an example (2) of the V2X transmission mode. In the transmission mode of the sidelink communication illustrated in FIG. 3, in step 1, the user equipment 20A transmits the PSCCH and the PSSCH to the user equipment 20B using the autonomously selected resource. Similarly, the user equipment 20B transmits the PSCCH and the PSSCH to the user equipment 20A using the autonomously selected resource (step 1). The transmission mode of the sidelink communication illustrated in FIG. 3 may be called sidelink transmission mode 2a in the NR. In the sidelink transmission mode 2a in the NR, the UE itself performs resource selection.

In the sidelink transmission mode 2a, the user equipment 20 on the transmission side performs sensing and selects a free SL resource. The sensing procedure may be executed by decoding Sidelink Control Information (SCI) transmitted from another user equipment 20, or may be executed based on received power by sidelink measurement. Sidelink Feedback Control Information (SFCI) transmitted through a Physical Sidelink Feedback Channel (PSFCH) may be used in the sensing procedure. A resource selection procedure for determining resources used for sidelink transmission is executed based on a result of the sensing procedure.

In addition, the granularity of resources applied to the sensing procedure and the resource selection procedure may be defined in PRB units, slot units, and other resource pattern units. By decoding the SCI applied to the sensing procedure, at least information regarding the sidelink resource notified by the user equipment 20 that transmits the SCI is acquired.

Figure 4:
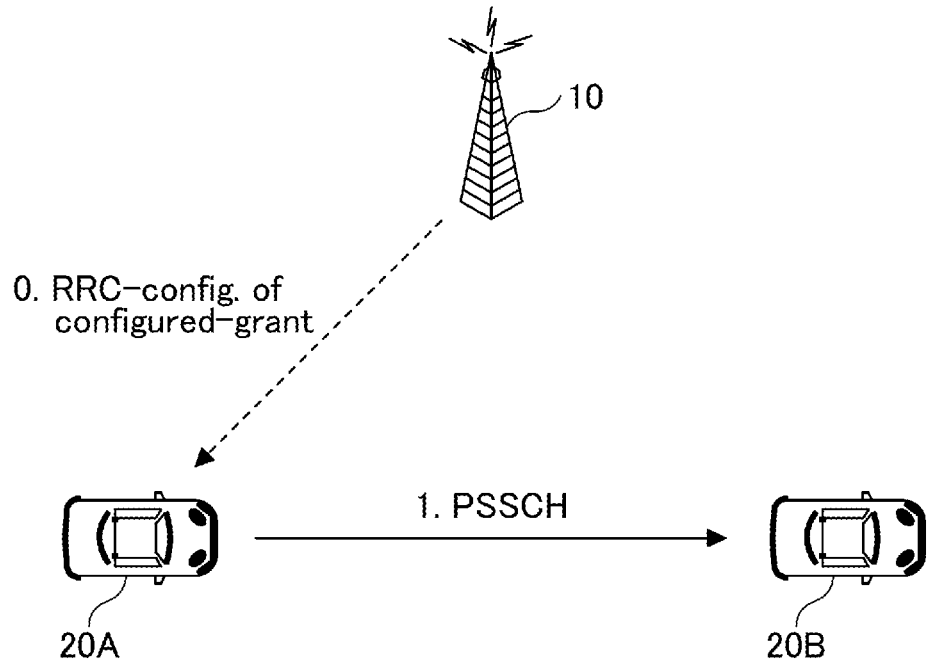
FIG. 4 is a diagram for describing an example (3) of a V2X transmission mode.

FIG. 4 is a diagram for describing an example (3) of the V2X transmission mode. In the transmission mode of the sidelink communication illustrated in FIG. 4, in step 0, the base station apparatus 10 transmits scheduling grant of the sidelink to the user equipment 20A through Radio Resource Control (RRC) configuration. Subsequently, the user equipment 20A transmits the PSSCH to the user equipment 20B based on the received scheduling grant (step 1). The transmission mode of the sidelink communication illustrated in FIG. 4 may be called sidelink transmission mode 2c in the NR.

Figure 5:
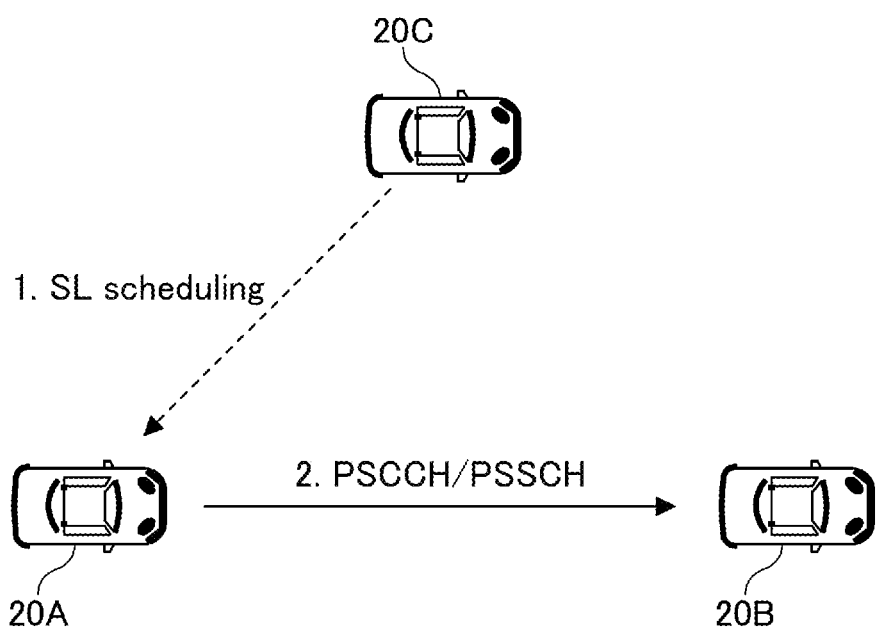
FIG. 5 is a diagram for describing an example (4) of a V2X transmission mode.

FIG. 5 is a diagram for describing an example (4) of the V2X transmission mode. In the transmission mode of the sidelink communication illustrated in FIG. 5, in step 1, a user equipment 20C transmits scheduling information of the sidelink to the user equipment 20A through the PSCCH. Subsequently, the user equipment 20A transmits the PSCCH and the PSSCH to the user equipment 20A based on the received scheduling information (step 2). The transmission mode of the sidelink communication illustrated in FIG. 5 may be called sidelink transmission mode 2d in the NR. Note that "transmitting the PSCCH" may be rephrased as transmitting control information using the PSCCH. In addition, "transmitting the PSSCH" may be rephrased as transmitting data using the PSSCH.

Figure 6:
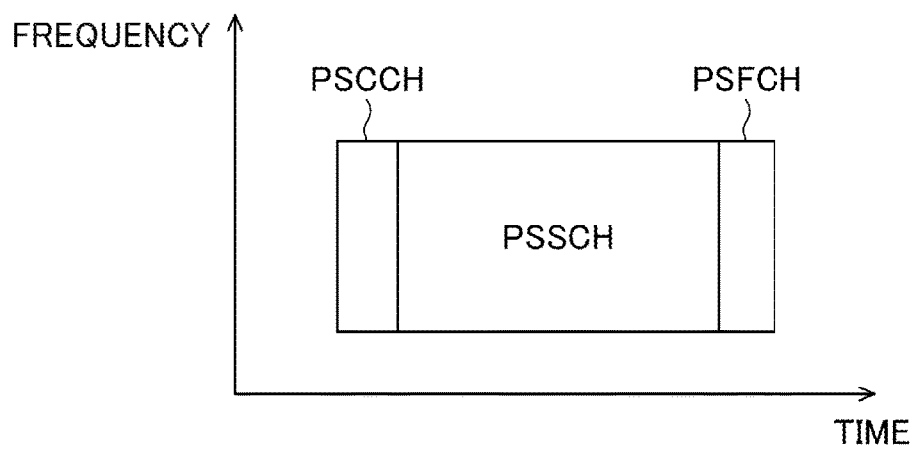
FIG. 6 is a diagram illustrating an example of a channel configuration.

FIG. 6 is an example of a sidelink channel configuration, in which a PSCCH, a PSSCH, and a PSFCH are arranged in order in the time domain. In addition, the arrangement of the PSCCH, the PSSCH, and the PSFCH is not limited to FIG. 6, and may be frequency domain multiplexed. For example, the PSCCH and the PSSCH may be arranged adjacent to each other in the frequency domain, and the transmission of the SCI through the PSCCH and the transmission of the data through the PSSCH may be performed simultaneously (for example, in one subframe).

(Regarding Configured Grant)

In the present embodiment, an operation example based on a configured grant in the SL will be described. Therefore, the configured grant will be described herein. Note that, generally, the grant includes information regarding resources (time and frequency resources) to be used by a communication device for signal transmission.

The grant includes a grant that is transmitted through the PDCCH or the like to dynamically permit transmission and a configured grant that is configured in advance by RRC signaling or the like. When a configured grant (including a time resource (or time and frequency resources), a period, and the like) is configured from a communication device A to a communication device B, for example, the communication device B performs signal transmission using the resource specified by the configured grant at a period specified by the configured grant. In addition, the communication device A may perform monitoring for signal reception using the resource specified by the configured grant at the period specified by the configured grant.

The communication device B in which the configured grant is configured does not need to receive the grant every time transmission is performed. Hereinafter, the configured grant may be described as "CG".

The CG includes a type 1 CG and a type 2 CG. In the type 1, CG configuration includes a resource (which may be a time resource or may be time and frequency resources) and a parameter (for example, an RRC parameter) for specifying a period. In the communication device B in which the type 1 CG is configured, the CG is always active. The communication device B can perform data transmission using the periodic resource without receiving signaling by the PDCCH/PSCCH. In addition, the communication device B may skip the transmission.

Also in the type 2, CG configuration includes a resource (which may be a time resource or may be time and frequency resources) and a parameter (for example, an RRC parameter) for specifying a period. In the communication device B in which the type 2 CG is configured, the CG is not active at the stage where CG configurations are just made. After receiving the activation command by DCI/SCI transmitted through the PDCCH/PSCCH, the communication device B can perform data transmission using the periodic resource. In addition, the communication device B may skip the transmission. When the communication device B receives the deactivation command by DCI/SCI, the CG becomes inactive.

By using the CG as described above, it is not necessary to receive the PDCCH/PSCCH every time transmission is performed. Therefore, waste of PDCCH/PSCCH resources can be avoided, and delay can be reduced. Each example described below can be applied to both type 1 and type 2.

Figure 7:
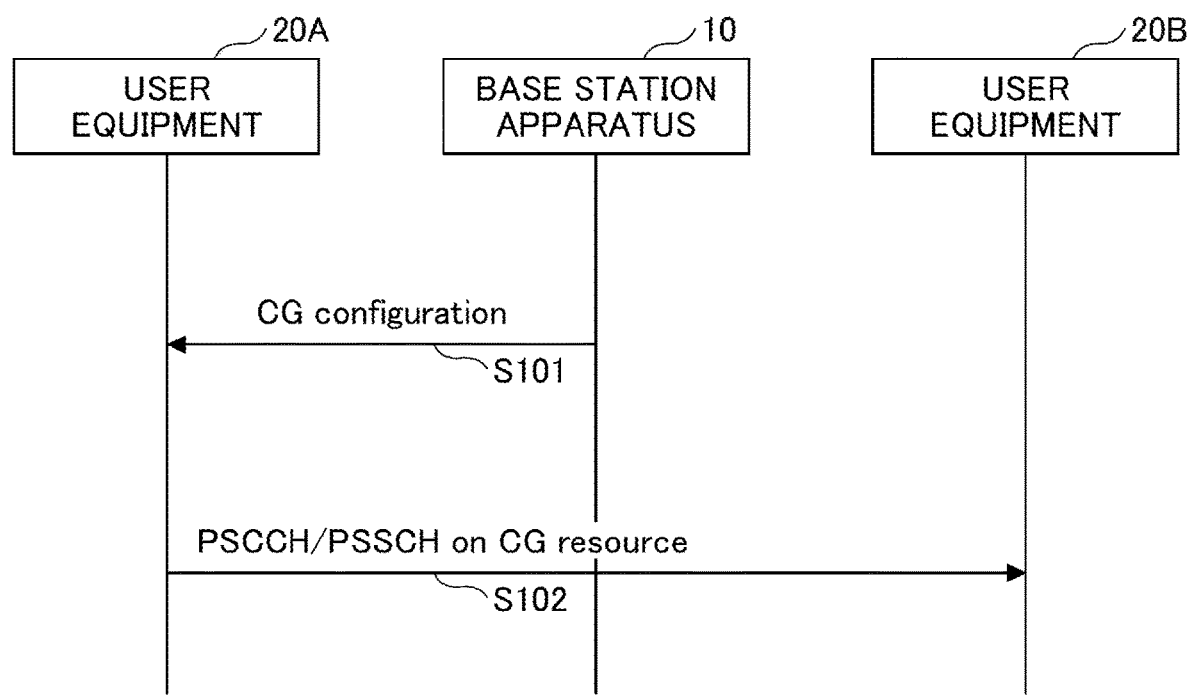
FIG. 7 is a diagram illustrating an example of communication by CG.

FIG. 7 is a sequence chart illustrating an example of an operation relevant to CG. In S101, CG configuration is transmitted from the base station apparatus 10 to the user equipment 20A by, for example, RRC signaling (higher layer signaling). The CG configuration includes parameters indicating a resource (time resource or time and frequency resources) and a period (periodicity) that can be used for SL transmission by the user equipment 20A.

The user equipment 20A in which the RRC configuration of the CG has been performed in S101 can perform transmission through the PSCCH/PSSCH using the CG resource in S102. "Transmission through the PSCCH/PSSCH" refers to transmitting the SCI through the PSCCH, transmitting data through the PSSCH, or performing transmission of the SCI through the PSCCH and transmission of data through the PSSCH simultaneously. The user equipment 20B can receive the data transmitted from the user equipment 20A using the resource specified by the SCI.

(Retransmission Control (HARQ Operation) in NR-Uu)

In the radio communication system according to the present embodiment, in NR-Uu, the user equipment 20 can perform retransmission of UL data transmission based on the CG. This operation example will be described with reference to FIG. 8. This operation example is based on Non-Patent Documents 1 and 2.

Figure 8:
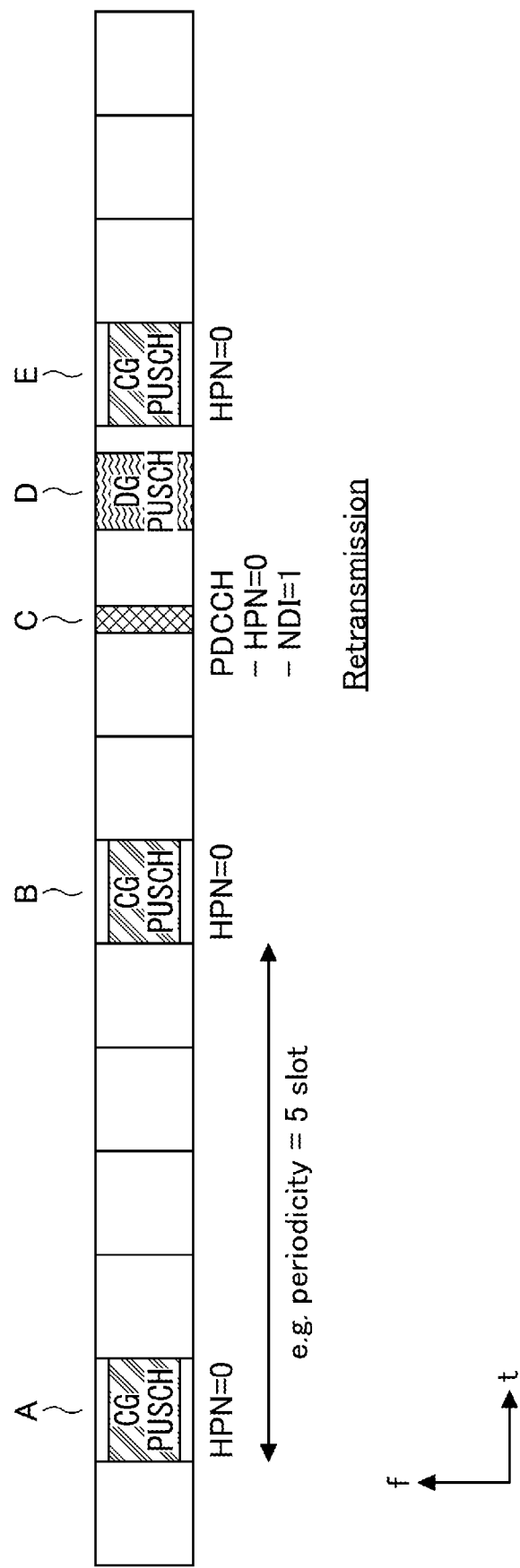
FIG. 8 is a diagram for describing an example of retransmission control in NR-Uu.

As a premise of the operation in FIG. 8, the user equipment 20 receives CG configuration. The CG configuration includes nrofHARQ-Processes indicating the number of HARQ processes. As to configured uplink grants, the HARQ process ID associated with the first symbol of UL transmission can be obtained by a equation described in the non-patent document 1 (except is as follows): For configured uplink grants, the HARQ Process ID associated with the first symbol of a UL transmission is derived from the following equation: HARQ Process ID=[floor(CURRENT symbol/periodicity)] modulo nrofHARQ-Processes where CURRENT symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

In addition, FIG. 8 is a diagram focusing on communication with HARQ process ID=0 (HPN=0). In addition, FIG. 8 exemplifies a case where the transmission period based on CG is 5 slots.

The user equipment 20 transmits data (TB: may be called a transport block) through the PUSCH using the CG resource at the timing indicated by A, and also transmits UL data in the next period (timing indicated by B).

A case is assumed in which the base station apparatus 10 has not been able to normally receive the UL data transmitted in B. At this time, at the timing indicated by C, the base station apparatus 10 transmits a UL grant with new data indicator (NDI)=1 to the user equipment 20 through the PDCCH. The UL grant is scrambled by Configured Scheduling (CS)-RNTI.

When the UL grant of NDI=1 that is a UL grant scrambled by the CS-RNTI is received, the user equipment 20 determines that the UL grant is a retransmission request (NDI is not toggled), and performs retransmission of the UL data transmitted in B using the resource dynamically specified by the UL grant (timing indicated by D). In E, UL transmission based on the CG is performed.

Hereinafter, operation examples of the retransmission control relevant to the sidelink will be described as Example 1 and Example 2.

Example 1

In Example 1, retransmission of data (which may be called TB) transmitted by the user equipment 20A using the PSSCH resource based on the CG is performed using the resource of the PSSCH scheduled by the dynamic grant (dynamic grant by the PDCCH or the PSCCH). The PSSCH resource based on the CG is, for example, a PSSCH resource configured by higher layer parameters in configuration information, such as sidelinkConfiguredGrantConfig, for example. The higher layer parameters may include a parameter (for example, an RRC parameter) for specifying a resource (which may be a time resource or may be time and frequency resources) and a period. In addition, the dynamic grant may be DCI transmitted from the base station apparatus 10 or SCI transmitted from another user equipment 20.

Figure 9:
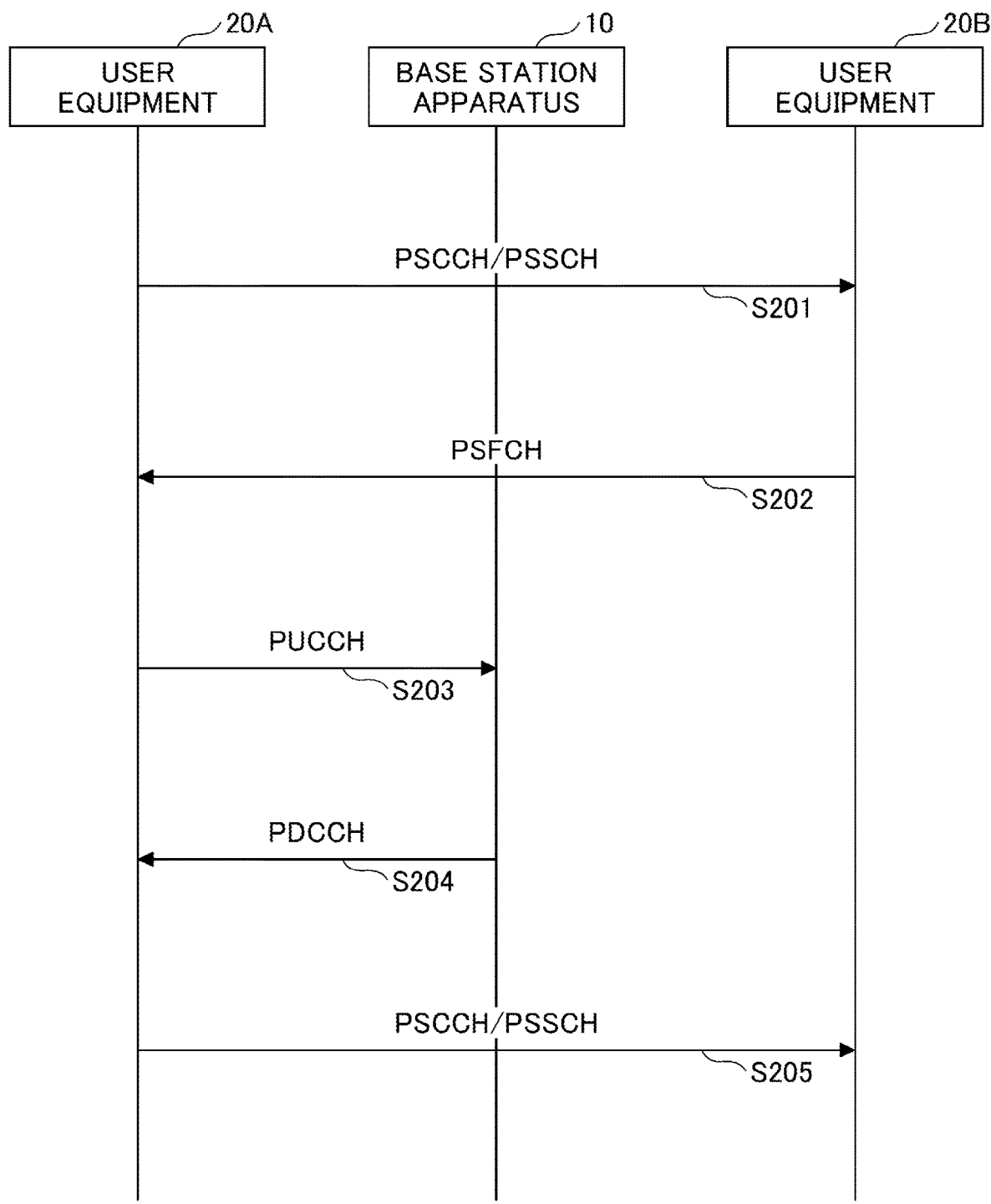
FIG. 9 is a sequence chart of processing in Example 1.
Figure 10:
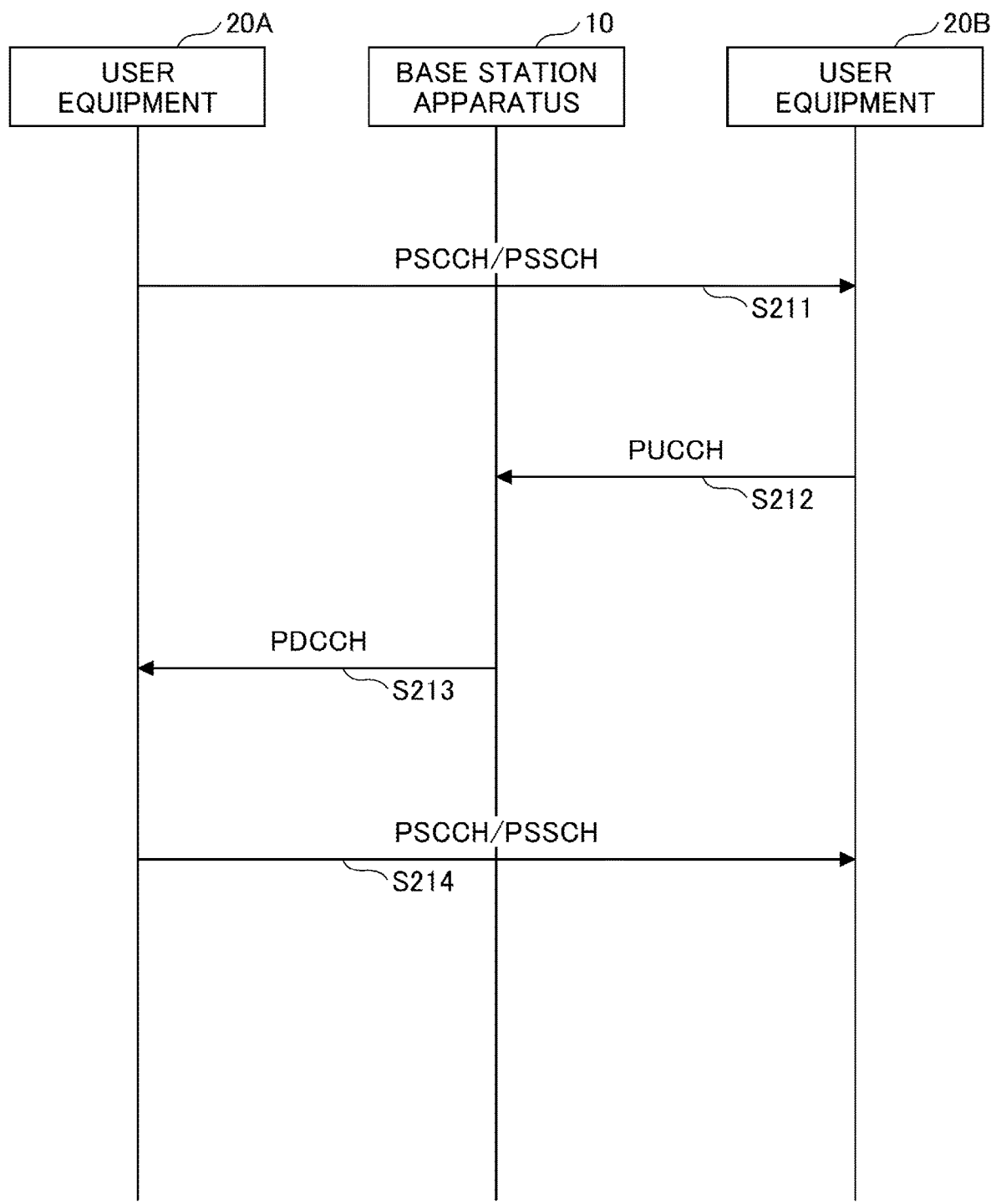
FIG. 10 is a sequence chart of processing in Example 1.

A sequence example of processing of Example 1 will be described with reference to FIGS. 9 and 10. Note that, FIGS. 9 and 10 illustrate an example of a case where the dynamic grant for retransmission is DCI transmitted from the base station apparatus 10. In FIGS. 9 and 10, for example, the base station apparatus 10 may be replaced with the user equipment 20C. In that case, for example, the PUCCH is replaced with the PSFCH, and the PDCCH is replaced with the PSCCH for carrying the SCI having dynamic grant information for retransmission.

As a premise of FIGS. 9 and 10, CG is configured in the user equipment 20A by the base station apparatus 10 (user equipment 20C).

In S201 of FIG. 9, the user equipment 20A transmits SCI/data (SCI only, data only, or SCI and data) through the PSCCH/PSSCH (PSCCH only, PSSCH only, or PSCCH and PSSCH) using the CG resource. Here, it is assumed that the user equipment 20B has failed in data reception. That is, for example, it is assumed that data cannot be normally received by the resource to be received.

In S202, the user equipment 20B transmits NACK to the user equipment 20A through the PSFCH. In S203, the user equipment 20A transmits NACK or Scheduling Request (SR) or Buffer Status Report (BSR) to the base station apparatus 10. In addition, the user equipment 20B may transmit ACK through the PSFCH when data can be normally received, and may not transmit anything when data cannot be normally received. In this case, the user equipment 20A can recognize that the data transmission has failed since the ACK was not received at the timing when the ACK should be received. Note that, when the user equipment 20B fails to receive the SCI in S201, the user equipment 20B does not transmit the PSFCH in S202 (DTX). In this case, the user equipment 20A can recognize the DTX since neither the ACK nor the NACK was received at the reception timing of ACK/NACK. In this case, S203 is executed after S201.

In S204, in response to receiving the NACK or the SR/BSR, the base station apparatus 10 transmits a sidelink grant, which is for retransmitting the sidelink data, to the user equipment 20A through the PDCCH. In S205, the user equipment 20A executes retransmission of the SCI/data through the PSCCH/PSSCH using the resource specified by the sidelink grant.

Next, an example illustrated in FIG. 10 will be described. In S211 of FIG. 10, the user equipment 20A transmits SCI/data through the PSCCH/PSSCH using the CG resource, and the user equipment 20B receives the SCI/data.

It is assumed that the user equipment 20B has failed to receive data. That is, it is assumed that normal data could not be received by the resource to be received. In S212, the user equipment 20B transmits NACK or Scheduling Request (SR) to the base station apparatus 10.

In S213, in response to receiving the NACK, the base station apparatus 10 transmits a sidelink grant, which is for retransmission of the sidelink data, to the user equipment 20A through the PDCCH. In S214, the user equipment 20A executes the retransmission of the SCI/data through the PSCCH/PSSCH using the resource specified by the sidelink grant.

Hereinafter, more detailed contents in Example 1 will be described as Example 1-1 and Example 1-2.

Example 1-1

Figure 11:
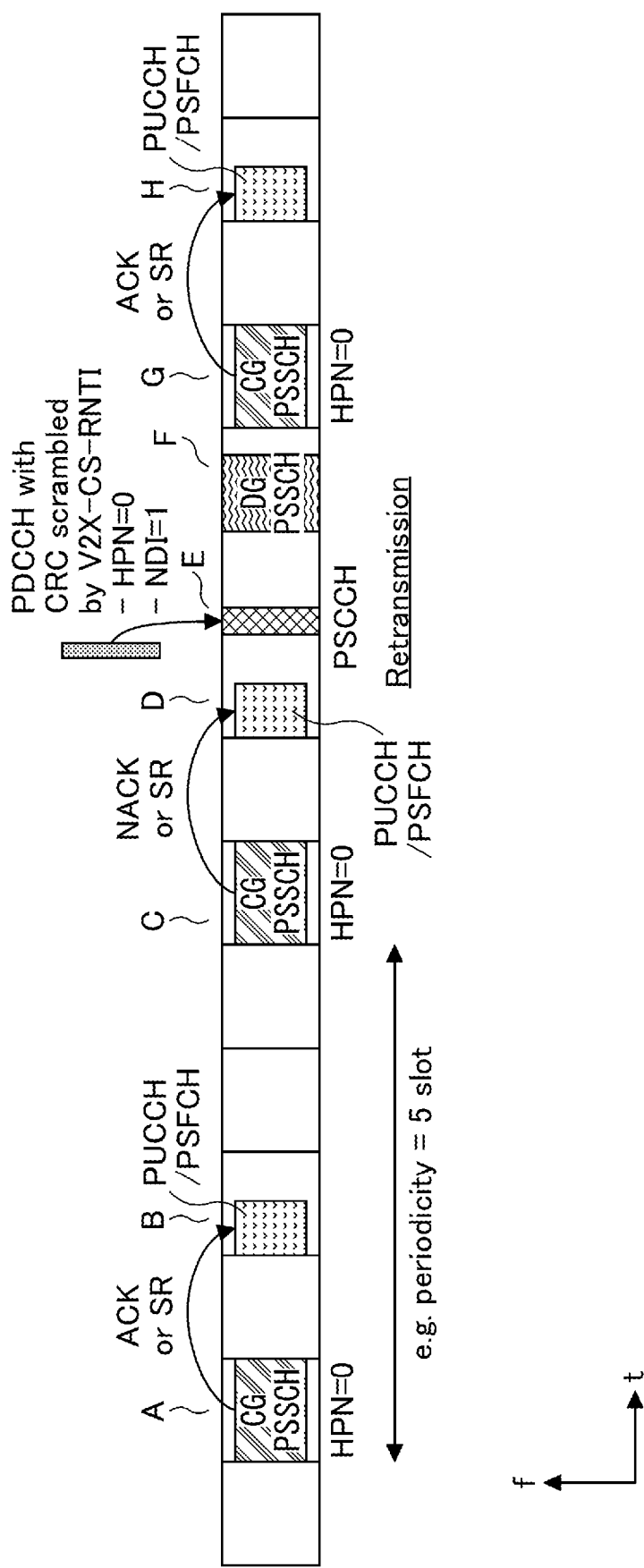
FIG. 11 is a diagram illustrating an example of retransmission control in Example 1-1.

First, Example 1-1 will be described. FIG. 11 is a diagram illustrating an example of retransmission control in Example 1-1. In addition, the sequence is as illustrated in FIG. 9 or FIG. 10, and FIG. 11 is a diagram focusing on resources and signals transmitted or received by the user equipment 20A having CG configuration. In addition, FIG. 11 is a diagram focusing on communication with HARQ process ID=0 (HPN=0). In addition, FIG. 11 exemplifies a case where the transmission period based on CG is 5 slots.

The user equipment 20A performs data transmission through the PSSCH using the CG resource at the timing indicated by A, and transmits ACK, SR, or BSR regarding the reception of the data to the base station apparatus 10 at the timing indicated by B. Note that, when the data is normally received, ACK, SR, or BSR may not be transmitted to the base station apparatus 10.

The user equipment 20A performs data transmission through the PSSCH using the CG resource at the timing indicated by C, but the data is not normally received. Therefore, at the timing indicated by D, NACK, SR, or BSR indicating that the reception of the data has failed is transmitted to the base station apparatus 10. Note that, when the data is not normally received, ACK may not be transmitted to the base station apparatus 10 to implicitly notify the base station apparatus 10 of ACK or SR.

The base station apparatus 10 (or the user equipment 20C) performs scrambling with a specific RNTI (here, for example, V2X-CS-RNTI) at the timing indicated by E, and transmits a sidelink grant with NDI as a specific value (here, NDI=1) to the user equipment 20A through the PDCCH (or the PSCCH).

The user equipment 20A determines that the sidelink grant is a retransmission request since the sidelink grant is scrambled by V2X-CS-RNTI and NDI=1, and retransmits data with the PSSCH resource dynamically specified by the sidelink grant (timing indicated by F). Thereafter, at G and H, data transmission based on CG and NACK/ACK/SR transmission are performed.

Figure 12:
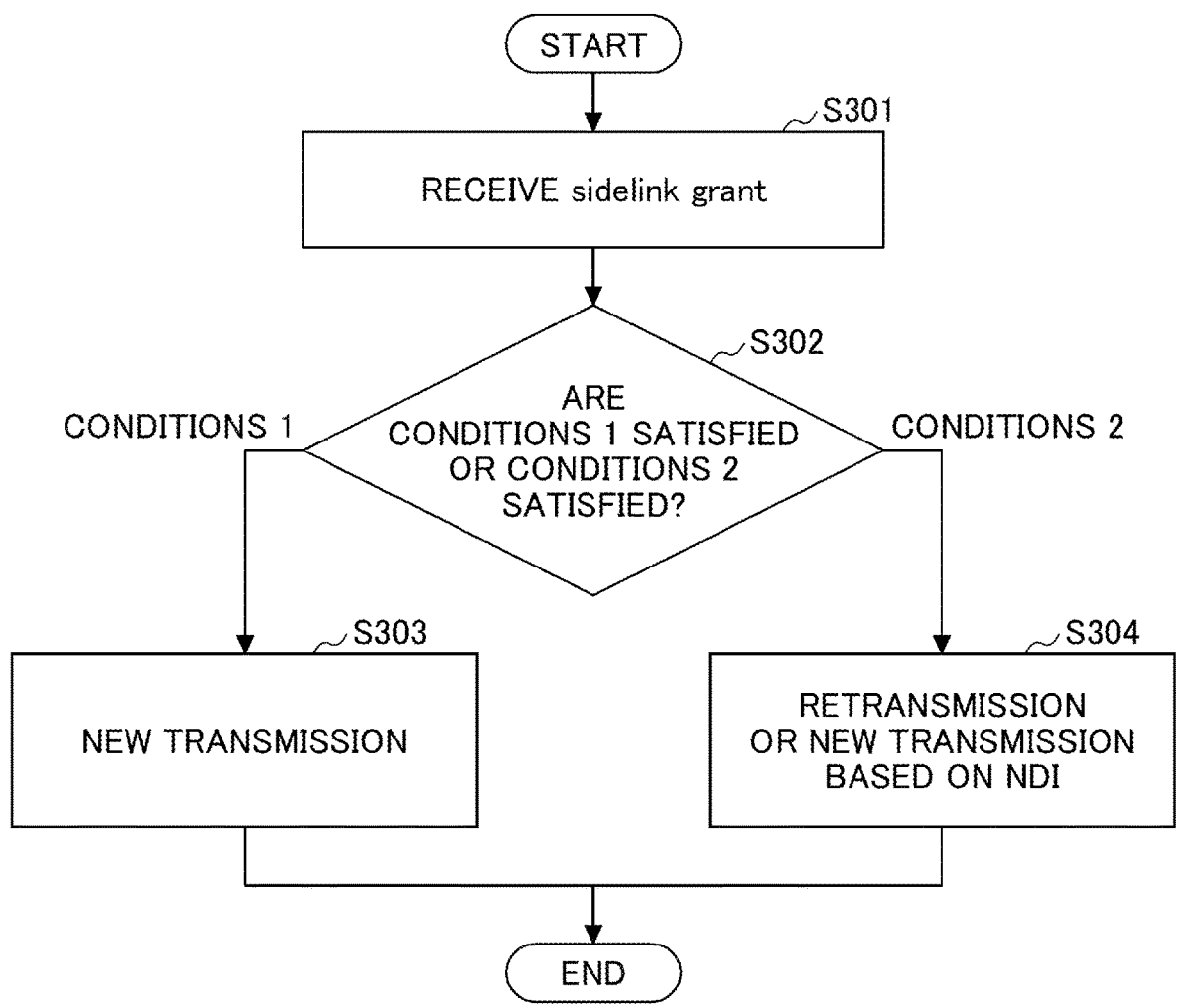
FIG. 12 is a flowchart for describing an operation of user equipment 20 in Example 1-1.

FIG. 12 is a flowchart for describing the operation of the user equipment 20A in Example 1-1. As a premise of FIG. 12, CG is configured in the user equipment 20A, and periodic sidelink data transmission based on the CG is performed, for example, as illustrated in FIG. 11.

In S301, the user equipment 20A receives a sidelink grant.

The user equipment 20A performs new transmission based on the sidelink grant when it is determined that the sidelink grant satisfies conditions 1 (S302, S303), and perform retransmission or new transmission based on the NDI when it is determined that the sidelink grant satisfies conditions 2 (S302, S304). The conditions 1 are as follows.

Conditions 1: "sidelink grant is scrambled by RNTI (for example, V2X-C-RNTI) for dynamic grant", and "previous sidelink grant for the same HARQ process is a sidelink grant scrambled by RNTI (for example, V2X-CS-RNTI) for the CG of the sidelink or is a configured sidelink grant".

When the conditions 1 are satisfied, the sidelink grant considers that the NDI has been toggled regardless of the value of the NDI.

The conditions 2 are as follows.

Conditions 2: "sidelink grant is scrambled by a specific RNTI (for example, V2X-CS-RNTI) for the CG of the sidelink".

When the conditions 2 are satisfied, if the NDI in the HARQ information of the sidelink grant is 1, it is considered that the NDI has not been toggled. That is, the user equipment 20A performs retransmission. Note that, considering that NDI has not been toggled when NDI=1 is an example. When the NDI is a specific value other than 1, it may be considered that the NDI has not been toggled.

In addition, an example of the operation of the user equipment 20A in Example 1-1 described in the same manner as the description method of the specification is as follows.

if the sidelink grant is for MAC entity's RNTI for dynamic grant (e.g. V2X-C-RNTI) and if the previous sidelink grant delivered to the HARQ entity for the same HARQ process was either a sidelink grant received for the MAC entity's specific RNTI for CG on SL (e.g. V2X-CS-RNTI) or a configured sidelink grant,
  consider the NDI to have been toggled for the corresponding HARQ process regardless of the value of the NDI.
if an sidelink grant for this PDCCH/PSCCH occasion has been received for this Serving Cell on the PDCCH/PSCCH for the MAC entity's specific RNTI for CG on SL (e.g. V2X-CS-RNTI),
  if the NDI in the received HARQ information is 1:
  consider the NDI for the corresponding HARQ process not to have been toggled;
  deliver the sidelink grant and the associated HARQ information to the HARQ entity.

Example 1-2

Figure 13:
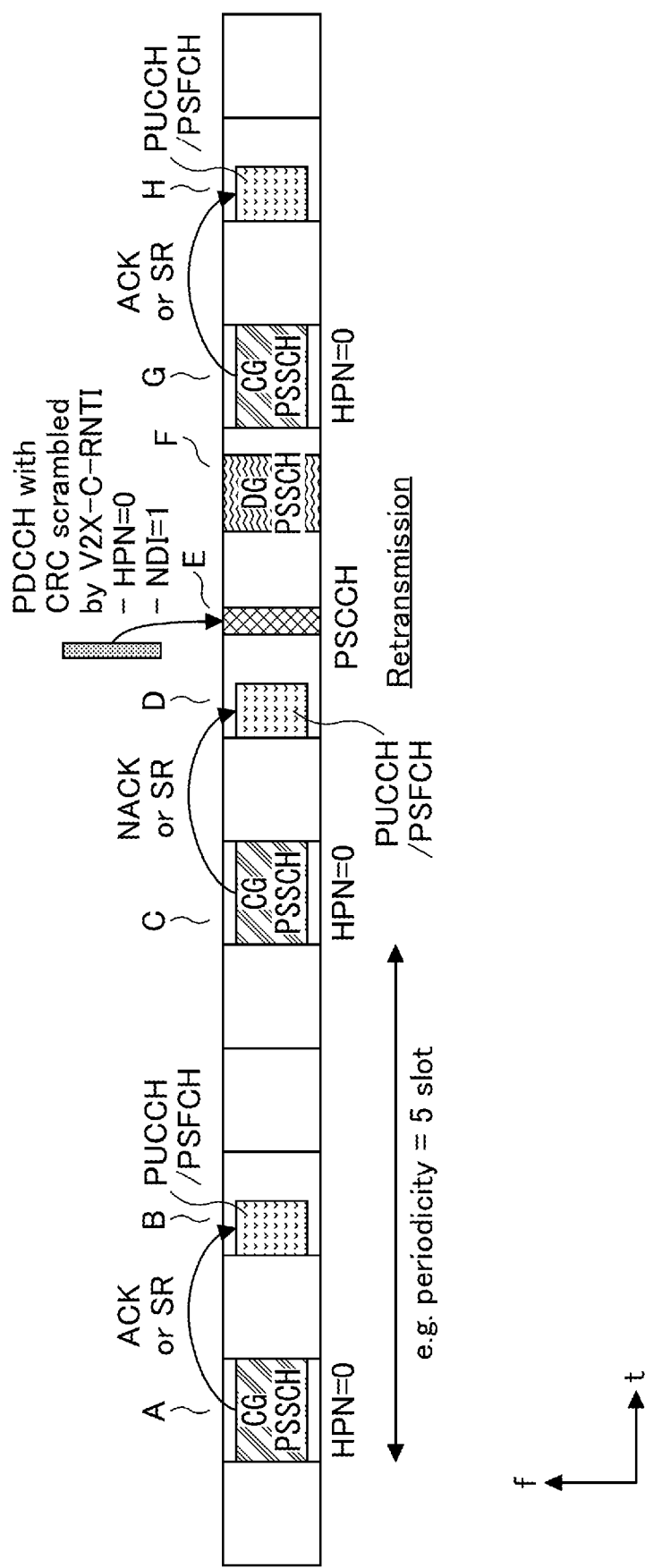
FIG. 13 is a diagram illustrating an example of retransmission control in Example 1-2.

Next, Example 1-2 will be described. FIG. 13 is a diagram illustrating an example of retransmission control in Example 1-2. In addition, the sequence is as illustrated in FIG. 9 or FIG. 10, and FIG. 13 is a diagram focusing on resources and signals transmitted or received by the user equipment 20A having CG configuration. In addition, FIG. 13 is a diagram focusing on communication with HARQ process ID=0 (HPN=0). In addition, FIG. 13 exemplifies a case where the transmission period based on CG is 5 slots.

The user equipment 20A performs data transmission through the PSSCH using the CG resource at the timing indicated by A, and transmits ACK, SR, or BSR regarding the reception of the data to the base station apparatus 10 at the timing indicated by B. Note that, when the data is normally received, ACK, SR, or BSR may not be transmitted to the base station apparatus 10.

The user equipment 20A performs data transmission through the PSSCH using the CG resource at the timing indicated by C, but the data is not normally received. Therefore, at the timing indicated by D, NACK, SR, or BSR indicating that the reception of the data has failed is transmitted to the base station apparatus 10. Note that, when the data is not normally received, ACK may not be transmitted to the base station apparatus 10 to implicitly notify the base station apparatus 10 of ACK, SR, or BSR.

The base station apparatus 10 (or the user equipment 20C) performs scrambling with a certain RNTI (here, for example, V2X-C-RNTI) at the timing indicated by E, and transmits a sidelink grant having a value of NDI (here, NDI=0) that has not been toggled to the user equipment 20A through the PDCCH (or the PDCCH).

Since the NDI has not been toggled, the user equipment 20A determines that the sidelink grant is a retransmission request, and retransmits data using the PSSCH resource dynamically specified by the sidelink grant (timing indicated by F). Thereafter, at G and H, data transmission based on CG and NACK/ACK/SR transmission are performed.

Figure 14:
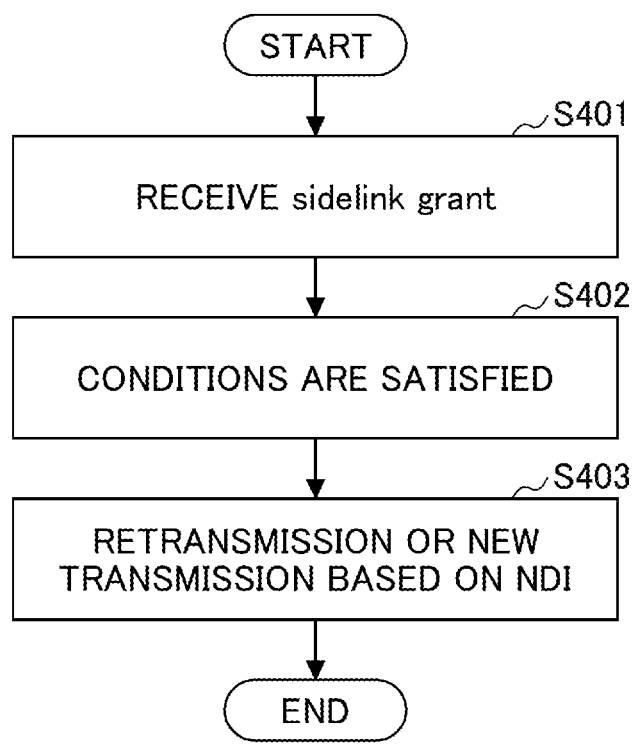
FIG. 14 is a flowchart for describing an operation of user equipment 20 in Example 1-2.

FIG. 14 is a flowchart for describing the operation of the user equipment 20A in Example 1-2. As a premise of FIG. 14, CG is configured in the user equipment 20A, and periodic sidelink data transmission based on the CG is performed, for example, as illustrated in FIG. 13.

In S401, the user equipment 20A receives a sidelink grant. When it is detected that the sidelink grant satisfies the conditions, the user equipment 20A performs retransmission or new transmission based on the NDI (S402, S403). The conditions are as follows.

Conditions: "sidelink grant is scrambled by RNTI (for example, V2X-C-RNTI) for dynamic grant or RNTI (for example, V2X-CS-RNTI) for CG of sidelink", and "previous sidelink grant for the same HARQ process is a sidelink grant scrambled by RNTI (for example, V2X-CS-RNTI) for CG of sidelink or is a configured sidelink grant".

When the conditions are satisfied, if the NDI in the HARQ information of the sidelink grant is toggled from the NDI in the previous dynamic sidelink grant (for example, sidelink grant scrambled by RNTI (for example, V2X-C-RNTI) for dynamic grant), it is considered that the NDI has been toggled. That is, new transmission is performed.

In addition, when the NDI in the HARQ information of the sidelink grant is not toggled from the NDI in the previous dynamic sidelink grant (for example, sidelink grant scrambled by RNTI (for example, V2X-C-RNTI) for dynamic grant), it is considered that the NDI has not been toggled. That is, retransmission is performed.

Note that, an example of the operation of the user equipment 20A in Example 1-2 described in the same manner as the description method of the specification is as follows.

if the sidelink grant is for MAC entity's RNTI for dynamic grant (e.g. V2X-C-RNTI) or RNTI for CG on SL (e.g. V2X-CS-RNTI), and if the previous sidelink grant delivered to the HARQ entity for the same HARQ process was either a sidelink grant received for the MAC entity's RNTI for CG on SL (e.g. V2X-CS-RNTI) or a configured sidelink grant, if the NDI in the received HARQ information has been toggled from NDI in the previous sidelink grant for MAC entity's RNTI for dynamic grant (e.g. V2X-C-RNTI), consider the NDI for the corresponding HARQ process to have been toggled.

else if the NDI in the received HARQ information has not been toggled from NDI in the previous sidelink grant for MAC entity's RNTI for dynamic grant (e.g. V2X-C-RNTI), consider the NDI for the corresponding HARQ process not to have been toggled.

According to the technique of Example 1 described above, the user equipment 20 can retransmit data before a CG resource next to the CG resource that has performed data transmission arrives. This can reduce the delay relevant to retransmission.

Example 2

Next, Example 2 will be described. In Example 2, retransmission of data (which may be called TB) transmitted by the user equipment 20A using the PSSCH resource based on the CG is performed using the PSSCH resource based on the CG. The PSSCH resource based on the CG is, for example, a PSSCH resource configured by higher layer parameters in a configuration, such as sidelinkConfiguredGrantConfig, for example.

Figure 15:
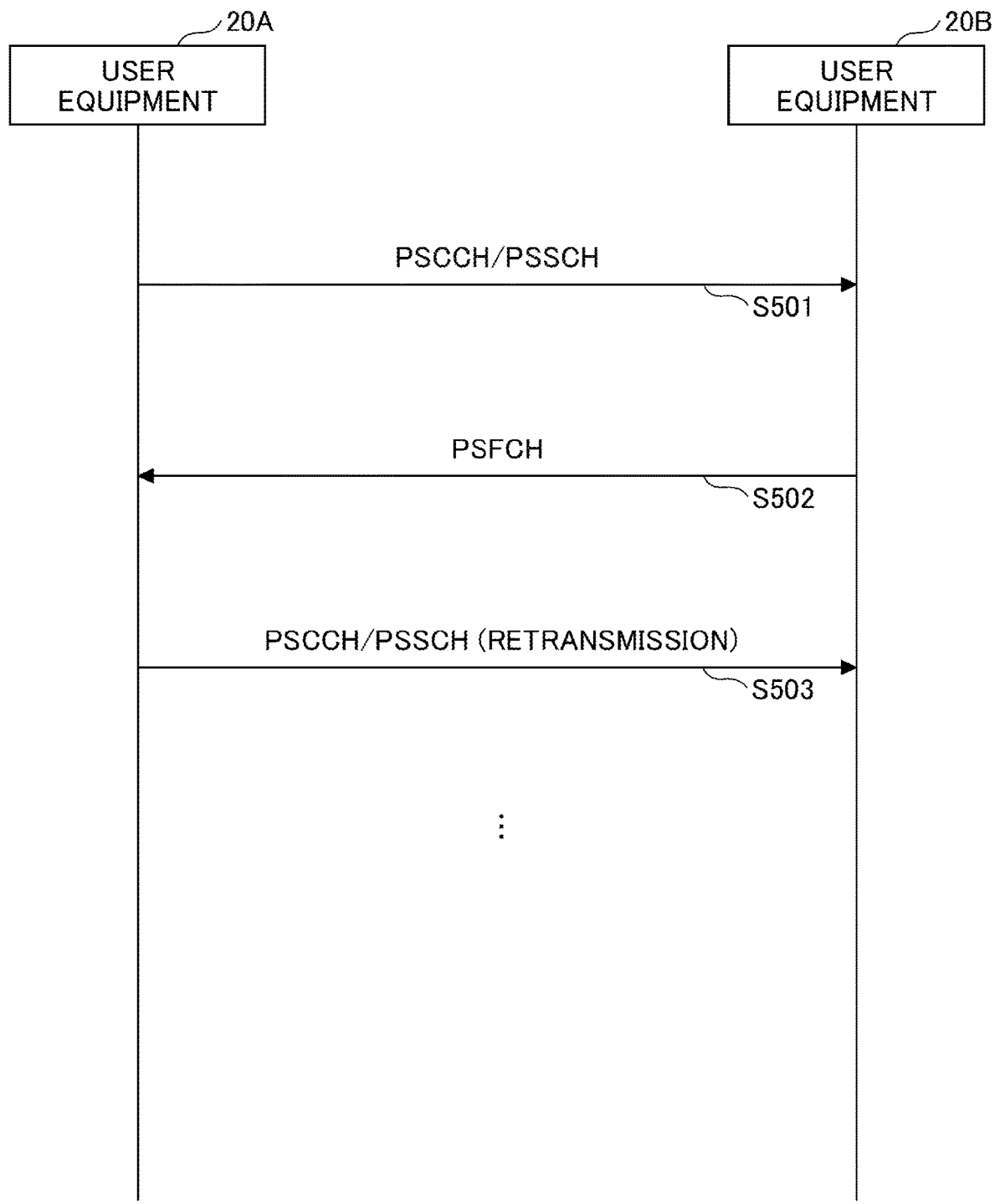
FIG. 15 is a sequence chart of processing in Example 2.

A sequence example of processing of Example 2 will be described with reference to FIG. 15. As a premise of FIG. 15, CG is configured in the user equipment 20A.

In S501, the user equipment 20A transmits SCI/data through the PSCCH/PSSCH using the CG resource. Here, it is assumed that the user equipment 20B has failed in data reception. That is, for example, it is assumed that normal data cannot be received by the resource to be received.

In S502, the user equipment 20B transmits NACK to the user equipment 20A through the PSFCH. In S503, the user equipment 20A retransmits SCI/data through the PSCCH/PSSCH using the CG resource. Note that, when the data reception fails, the user equipment 20B may not transmit the ACK to implicitly notify the user equipment 20A of the NACK.

In Example 2, a new data indicator (NDI) is included in the SCI (transmitted through the PSCCH) specifying the PSSCH resource and the like, and whether the data transmitted by the PSSCH resource is new data or retransmission data can be determined based on whether or not the NDI is toggled. Note that, toggling means, for example, changing 0 to 1 or changing 1 to 0.

Figure 16:
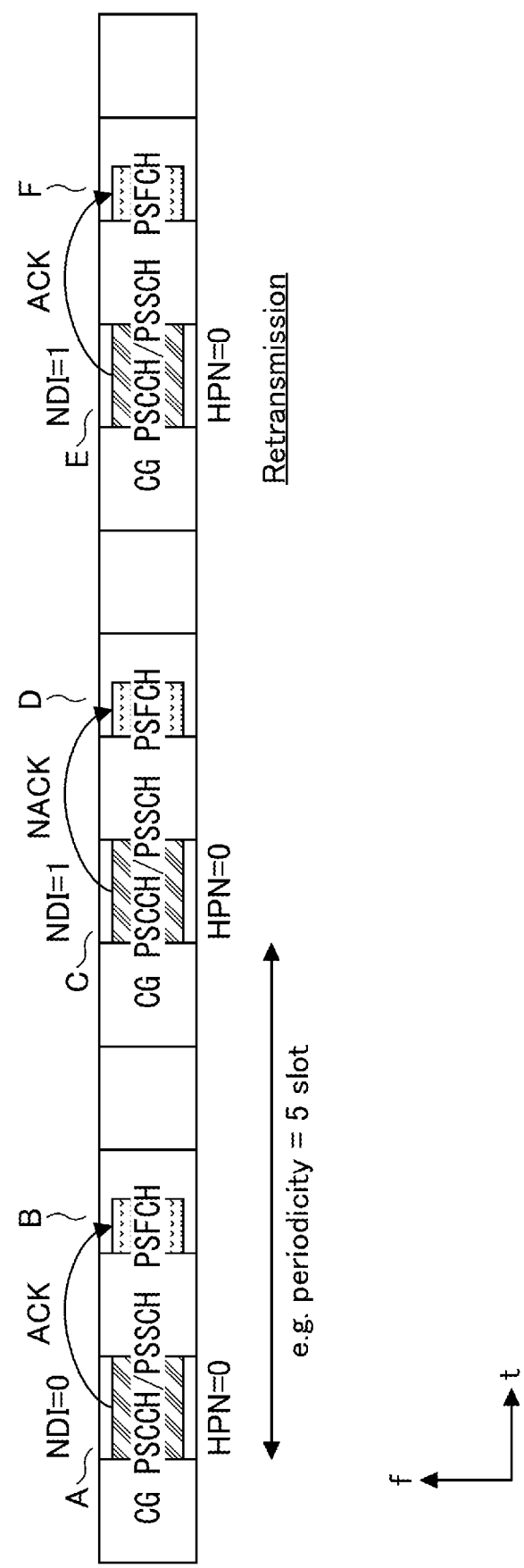
FIG. 16 is a diagram illustrating an example of retransmission control in Example 2.

FIG. 16 is a diagram illustrating an example of retransmission control in Example 2. Note that, the sequence is as illustrated in FIG. 15, and FIG. 16 is a diagram focusing on resources and signals transmitted or received by the user equipment 20A having CG configuration. In addition, FIG. 16 is a diagram focusing on communication with HARQ process ID=0 (HPN=0). In addition, FIG. 16 exemplifies a case where the transmission period based on CG is 5 slots. In addition, in the example illustrated in FIG. 16, an example is illustrated in which the SCI on the PSCCH and the data on the PSSCH are transmitted simultaneously (or in the CG resource).

The user equipment 20A transmits the SCI (NDI=0)/data through the PSCCH/PSSCH using the CG resource at the timing indicated by A, and receives ACK relevant to the reception of the data at the timing indicated by B. When the data is successfully received, the ACK may not be transmitted.

The user equipment 20A transmits the SCI (NDI=1)/data through the PSCCH/PSSCH using the CG resource at the timing indicated by C, but the data is not normally received. Therefore, at the timing indicated by D, NACK indicating that the reception of the data has failed is received. Note that, it may be determined that data reception has failed by not receiving the ACK.

At the timing indicated by E, the user equipment 20A performs retransmission. That is, the user equipment 20A transmits the SCI (NDI=1)/retransmission data through the PSCCH/PSSCH using the CG resource at the timing indicated by E, and receives ACK relevant to the reception of the data at the timing indicated by F.

More specifically, when it is determined that the conditions X are satisfied, the user equipment 20A executes an operation Y. The conditions X and the operation Y are as follows.

Conditions X: "sidelink grant is a grant of configured sidelink grant or a sidelink grant scrambled by RNTI (for example, V2X-CS-RNTI) for the CG of the sidelink", and "previous sidelink grant for the same HARQ process is a grant of configured sidelink grant or a sidelink grant scrambled by RNTI (for example, V2X-CS-RNTI) for the CG of the sidelink".

Operation Y: When performing new transmission of data, the NDI in the HARQ information in the sidelink grant is toggled from the NDI in the HARQ information in the previous sidelink grant. When retransmitting data, the NDI in the HARQ information in the sidelink grant is not toggled from the NDI in the HARQ information in the previous sidelink grant.

From the viewpoint of the user equipment 20B on the receiving side, if the NDI is toggled from the previous NDI, it is considered that the NDI has been toggled (that is, determination as new transmission is made). If the NDI is not toggled from the previous NDI, it is considered that the NDI has not been toggled (that is, determination as retransmission is made).

In addition, in each resource of the CG, HARQ-ACK for the data transmitted from the user equipment 20A may be transmitted through the PSFCH from the user equipment 20B on the receiving side. The user equipment 20A may perform retransmission if the ACK is not received.

Note that, an example of the operation of the user equipment 20A or the user equipment 20B in Example 2 described in the same manner as the description method of the specification is as follows.

if the sidelink grant is for a configured sidelink grant and if the previous sidelink grant delivered to the HARQ entity for the same HARQ process was either a sidelink grant received for a configured sidelink grant or the MAC entity's RNTI for CG on SL (e.g. V2X-CS-RNTI), if the NDI in the received HARQ information has been toggled from NDI in the previous sidelink grant, consider the NDI for the corresponding HARQ process to have been toggled.

else if the NDI in the received HARQ information has not been toggled from NDI in the previous sidelink grant, consider the NDI for the corresponding HARQ process not to have been toggled.

UE assumes retransmission until receiving HARQ-ACK.

According to the technique of Example 2 described above, the user equipment 20 can retransmit data using a CG resource next to the CG resource that has performed data transmission. That is, retransmission can be performed without allocating new resources by the base station apparatus 10.

OTHER EXAMPLES

In Examples 1 and 2, examples have been described in which the type of sidelink grant is identified by the RNTI. However, identifying the type of sidelink grant by the RNTI is only an example. Instead of or in addition to the RNTI, a DCI format, CORSET, Search Speace, or an SCI format may be used to identify the type of sidelink grant.

For example, when the user equipment 20A receives sidelink grant of DCI format A (or SCI format A), the user equipment A determines that the sidelink grant is a dynamic grant (dynamic grant similar to that scrambled by V2X-C-RNTI). In addition, for example, when the user equipment 20A receives sidelink grant of DCI format B (or SCI format B), the user equipment A determines that the sidelink grant is a sidelink grant for CG (dynamic grant similar to that scrambled by V2X-CS-RNTI).

(Equipment Configuration)

Next, functional configuration examples of the base station apparatus 10 and the user equipment 20 that execute the processing and the operations described up to now will be described. The base station apparatus 10 and the user equipment 20 have all functions in the embodiment described above. However, each of the base station apparatus 10 and the user equipment 20 may have only some (for example, only Example 1 or only Example 2) of all functions in the embodiment.

<Base Station Apparatus 10>

Figure 17:
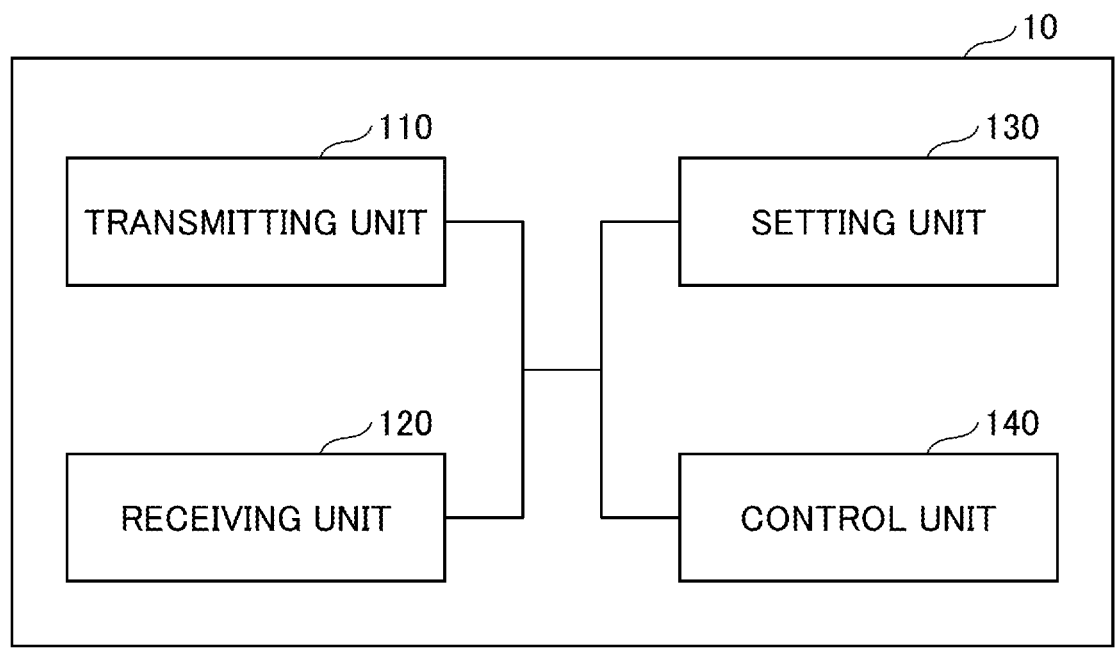
FIG. 17 is a diagram illustrating an example of the functional configuration of base station apparatus 10 according to an embodiment of the invention.

FIG. 17 is a diagram illustrating an example of the functional configuration of the base station apparatus 10. As illustrated in FIG. 17, the base station apparatus 10 includes a transmitting unit 110, a receiving unit 120, a setting unit 130, and a control unit 140. The functional configuration illustrated in FIG. 17 is only an example. As long as the operation according to the embodiment of the invention can be performed, any functional division and any name of each functional unit may be applied.

The transmitting unit 110 has a function of generating a signal to be transmitted to the user equipment 20 and transmitting the signal wirelessly. The receiving unit 120 has a function of receiving various signals transmitted from the user equipment 20 and acquiring, for example, information of higher layers from the received signals. In addition, the transmitting unit 110 has a function of transmitting NR-PSS, NR-SSS, NR-PBCH, a DL/UL control signal, a DL reference signal, an RRC message, and the like to the user equipment 20.

The setting unit 130 stores a configuration information configured in advance and various configurations to be transmitted to the user equipment 20 in a storage device provided in the setting unit 130, and reads out the configuration from the storage device as necessary. The content of the configuration is, for example, information regarding the setting of the configured grant. The control unit 140 controls the base station apparatus 10. A functional unit relevant to signal transmission in the control unit 140 may be included in the transmitting unit 110, and a functional unit relevant to signal reception in the control unit 140 may be included in the receiving unit 120.

<User Equipment 20>

Figure 18:
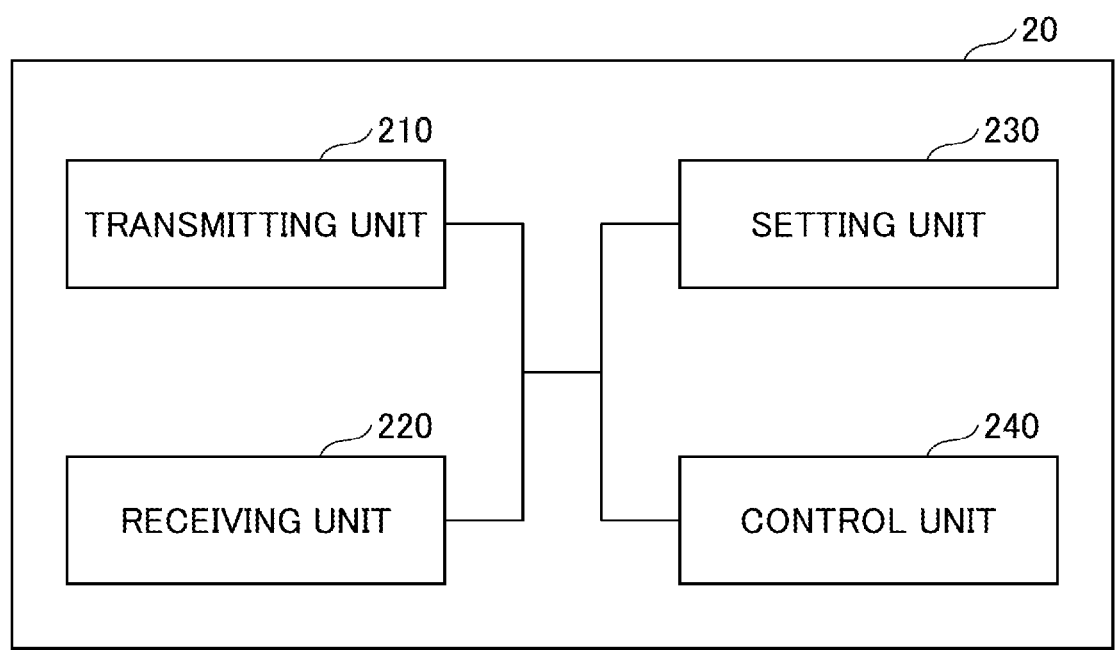
FIG. 18 is a diagram illustrating an example of the functional configuration of user equipment 20 according to an embodiment of the invention.

FIG. 18 is a diagram illustrating an example of the functional configuration of the user equipment 20. As illustrated in FIG. 18, the user equipment 20 includes a transmitting unit 210, a receiving unit 220, a setting unit 230, and a control unit 240. The functional configuration illustrated in FIG. 18 is only an example. As long as the operation according to the embodiment of the invention can be performed, any functional division and any name of each functional unit may be applied.

The transmitting unit 210 generates a transmission signal from transmission data, and transmits the transmission signal wirelessly. The receiving unit 220 wirelessly receives various signals, and acquires a higher-layer signal from the received physical layer signal. In addition, the receiving unit 220 has a function of receiving NR-PSS, NR-SSS, NR-PBCH, a DL/UL/SL control signal, an RRC message, a reference signal, and the like transmitted from the base station apparatus 10. In addition, for example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), and Physical Sidelink Feedback Channel (PSFCH) to another user equipment 20 as D2D communication, and the receiving unit 220 receives the PSCCH, the PSSCH, the PSDCH, the PSBCH, the PSFCH, and the like from another user equipment 20.

The setting unit 230 stores the various configurations, which have been received from the base station apparatus 10 or the user equipment 20 by the receiving unit 220, in a storage device provided in the setting unit 230, and reads out the configuration from the storage device as necessary. The setting unit 230 also stores the configuration information configured in advance. The content of the configuration is, for example, information regarding the setting of the configured grant. The control unit 240 controls the user equipment 20. A functional unit relevant to signal transmission in the control unit 240 may be included in the transmitting unit 210, and a functional unit relevant to signal reception in the control unit 240 may be included in the receiving unit 220.

(Hardware Configuration)

The block diagrams (FIGS. 17 and 18) used in the description of the above embodiment illustrate blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or wireless connection) and using the plurality of devices. Each functional block may be realized by combining the above-described one device or the above-described plurality of devices with software.

Functions include determining, judging, calculating, computing, processing, deriving, investigating, looking up, ascertaining, receiving, transmitting, output, access, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes transmission function is called a transmitting unit or a transmitter. In any case, as described above, the realization method is not particularly limited.

Figure 19:
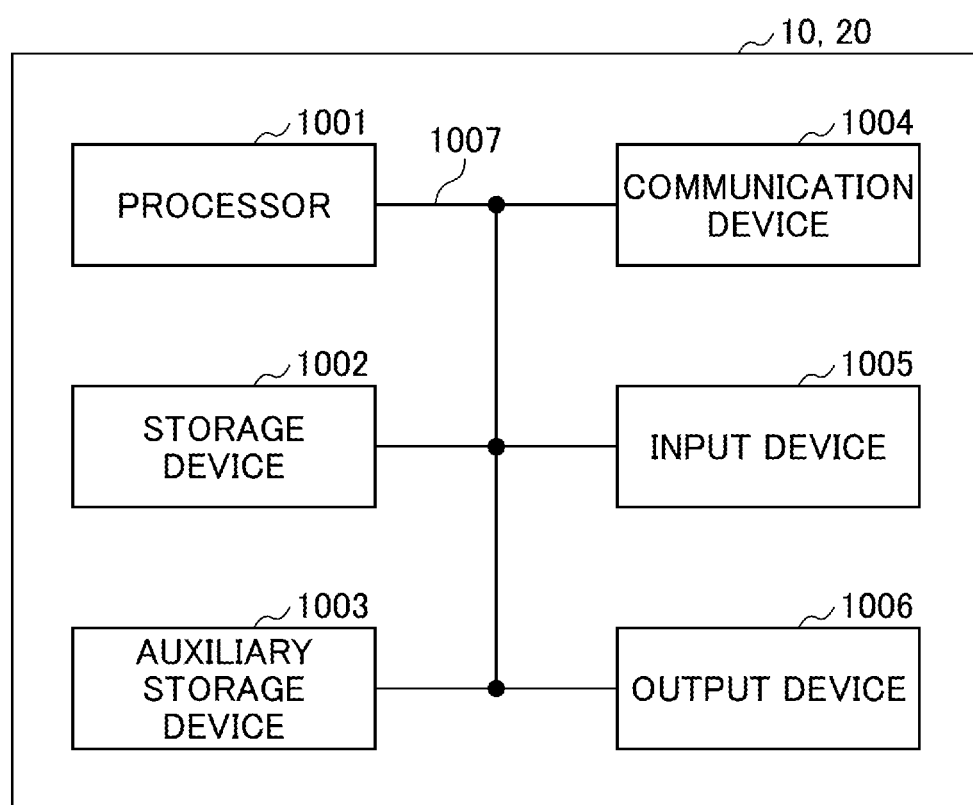
FIG. 19 is a diagram illustrating an example of the hardware configuration of base station apparatus 10 or user equipment 20 according to an embodiment of the invention.

For example, the base station apparatus 10, the user equipment 20, and the like according to an embodiment of the present disclosure may function as a computer that performs processing of the radio communication method according to the present disclosure. FIG. 19 is a diagram illustrating an example of the hardware configuration of the base station apparatus 10 and the user equipment 20 according to an embodiment of the present disclosure. Each of the base station apparatus 10 and the user equipment 20 described above may be physically configured as a computer apparatus including a processor 1001, a storage device 1002, an auxiliary storage device 1003, a communication device 1004, an input device 1005, an output device 1006, a bus 1007, and the like.

Note that, in the following description, the term "device" can be read as a circuit, a unit, and the like. The hardware configuration of each of the base station apparatus 10 and the user equipment 20 may be configured to include one or more devices for each device illustrated in the diagram, or may be configured not to include some devices.

Each function in the base station apparatus 10 and the user equipment 20 can be realized by reading predetermined software (program) onto hardware, such as the processor 1001 and the storage device 1002, so that the processor 1001 performs an operation and controlling communication using the communication device 1004 or controlling at least one of reading and writing of data in the storage device 1002 and the auxiliary storage device 1003.

The processor 1001 controls the entire computer by operating an operating system, for example. The processor 1001 may be configured by a central processing unit (CPU) including an interface with peripheral equipment, a control device, an operation device, a register, and the like. For example, the control unit 140, the control unit 240, and the like described above may be realized by the processor 1001.

In addition, the processor 1001 reads a program (program code), a software module, data, and the like into the storage device 1002 from at least one of the auxiliary storage device 1003 and the communication device 1004, and executes various kinds of processing according to these. As the program, a program causing a computer to execute at least a part of the operation described in the above embodiment is used. For example, the control unit 140 of the base station apparatus 10 illustrated in FIG. 17 may be realized by a control program that is stored in the storage device 1002 and operated by the processor 1001. In addition, for example, the control unit 240 of the user equipment 20 illustrated in FIG. 18 may be realized by a control program that is stored in the storage device 1002 and operated by the processor 1001. Although it has been described that the various kinds of processing described above are executed by one processor 1001, the various kinds of processing described above may be executed simultaneously or sequentially by two or more processors 1001. The processor 1001 may be implemented by one or more chips. In addition, the program may be transmitted from a network through a telecommunication line.

The storage device 1002 is a computer-readable recording medium, and may be configured by at least one of, for example, a Read Only Memory (ROM), an Erasable Programmable ROM (EPROM), an Electrically Erasable Programmable ROM (EEPROM), and a Random Access Memory (RAM). The storage device 1002 may be called a register, a cache, a main memory, and the like. The storage device 1002 can store a program (program code), a software module, and the like that can be executed to execute the communication method according to an embodiment of the present disclosure.

The auxiliary storage device 1003 is a computer-readable recording medium, and may be configured by at least one of, for example, an optical disk such as a Compact Disc ROM (CD-ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage medium described above may be, for example, a database including at least one of the storage device 1002 and the auxiliary storage device 1003, a server, or other appropriate media.

The communication device 1004 is hardware (transmitting and receiving device) for performing communication between computers through at least one of a wired network and a radio network, and is also referred to as, for example, a network device, a network controller, a network card, and a communication module. The communication device 1004 may be configured to include, for example, a high-frequency switch, a duplexer, a filter, a frequency synthesizer, and the like in order to realize at least one of frequency division duplex (FDD) and time division duplex (TDD), for example. For example, a transmitting and receiving antenna, an amplifier unit, a transmitting and receiving unit, a transmission line interface, and the like may be realized by the communication device 1004. The transmitting and receiving unit may be implemented so as to be physically or logically separated from the transmitting unit and the receiving unit.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel).

In addition, respective devices, such as the processor 1001 and the storage device 1002, are connected to each other by the bus 1007 for communicating information. The bus 1007 may be configured using a single bus, or may be configured using a different bus for each device.

In addition, each of the base station apparatus 10 and the user equipment 20 may be configured to include hardware, such as a microprocessor, a digital signal processor (DSP), an Application Specific Integrated Circuit (ASIC), a Programmable Logic Device (PLD), and a Field Programmable Gate Array (FPGA), and some or all of the functional blocks may be realized by the hardware. For example, the processor 1001 may be implemented using at least one of these hardware components.

Summary of Embodiment

In the present embodiment, at least user equipment and a communication method described in the following articles are provided.
(Article 1)
A user equipment including: a transmitting unit that transmits data using a resource specified by a sidelink grant configured in advance; and a receiving unit that receives a sidelink grant for retransmission of the data, in which the transmitting unit retransmits the data based on the sidelink grant for the retransmission.
(Article 2)
The user equipment described in Article 1, in which the sidelink grant for the retransmission is scrambled by a specific RNTI, and includes a specific indicator value.
(Article 3)
The user equipment described in Article 1, in which the sidelink grant for the retransmission includes an indicator value that is not toggled from an indicator value in a previous sidelink grant.
(Article 4)
A user equipment including a transmitting unit that transmits first control information and data using a resource specified by a sidelink grant configured in advance, in which the transmitting unit transmits second control information including an indicator value, which is not toggled from an indicator value in the first control information, and retransmission data of the data using the resource specified by the sidelink grant.
(Article 5)
A user equipment including: a receiving unit that receives first control information and first data transmitted using a resource specified by a sidelink grant configured in advance and receives second control information and second data transmitted using a resource specified by the sidelink grant; and a control unit that determines that the second data is retransmission data of the first data when it is detected that an indicator value in the second control information is not toggled from an indicator value in the first control information.
(Article 6)
A communication method executed by user equipment, including: a step of transmitting data using a resource specified by a sidelink grant set in advance; a step of receiving a sidelink grant for retransmission of the data; and a step of retransmitting the data based on the sidelink grant for the retransmission.

By any of the techniques in Articles 1 to 6, a technique for realizing retransmission of data transmitted based on a configured grant in the sidelink is provided. In addition, according to Articles 2 and 3, it is possible to appropriately determine the sidelink grant for retransmission.

Supplement to Embodiment

While the embodiment of the invention has been described above, the disclosed invention is not limited to such an embodiment, and those skilled in the art will understand various variations, modifications, alternatives, substitutions, and the like. Although the description has been made using specific numerical examples to facilitate the understanding of the invention, those numerical values are merely examples and any appropriate values may be used unless otherwise specified. The division of the items in the above description is not essential to the invention, and the matters described in two or more items may be used in combination as necessary, or the matter described in a certain item may be applied to the matter described in another item (unless there is a contradiction). The boundaries between functional units or processing units in the functional block diagrams do not always correspond to the boundaries between physical components. The operation of a plurality of functional units may be physically performed by one component, or the operation of one functional unit may be physically performed by a plurality of components. In the processing procedure described in the embodiment, the order of the processing may be changed as long as there is no contradiction. Although the base station apparatus 10 and the user equipment 20 have been described using functional block diagrams for convenience of description of the processing, such equipment may be realized by hardware, software, or a combination thereof. The software operated by the processor of the base station apparatus 10 according to the embodiment of the invention and the software operated by the processor of the user equipment 20 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage media.

In addition, the notification of information is not limited to the aspect/embodiment described in the present disclosure, and may be performed using other methods. For example, the notification of information may be performed using physical layer signaling (for example, Downlink Control Information (DCI), Uplink Control Information (UCI)), higher layer signaling (for example, Radio Resource Control (RRC) signaling, Medium Access Control (MAC) signaling, broadcast information (Master Information Block (MIB), System Information Block (SIB)), other signals, or a combination thereof. In addition, the RRC signaling may be called an RRC message, and may be, for example, an RRC connection setup message or an RRC connection reconfiguration message.

Each aspect/embodiment described in the present disclosure may be applied to at least one of systems, which use Long Term Evolution (LTE), LTE-Advanced (LTE-A), SUPER 3G, IMT-Advanced, 4th generation mobile communication system (4G), 5th generation mobile communication system (5G), Future Radio Access (FRA), and new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), and other appropriate systems, and next-generation systems extended based on these. In addition, a plurality of systems may be combined (for example, a combination of 5G and at least one of LTE and LTE-A) to be applied.

In the processing procedure, sequence, flowchart, and the like in each aspect/embodiment described in this specification, the order may be changed as long as there is no contradiction. For example, for the methods described in this disclosure, elements of various steps are presented using an exemplary order, and the invention is not limited to the specific order presented.

The specific operation described as being performed by the base station apparatus 10 in this specification may be performed by its upper node in some cases. In a network including one or more network nodes each having the base station apparatus 10, it is obvious that various operations performed for communication with the user equipment 20 can be performed by at least one of the base station apparatus 10 and other network nodes (for example, MME, S-GW, and the like can be considered, but the network node is not limited thereto) other than the base station apparatus 10. Although a case where the number of other network nodes other than the base station apparatus 10 is one has been exemplified above, the other network nodes may be a combination (for example, MME and S-GW) of a plurality of other network nodes.

Information or signals described in the present disclosure can be output from a higher layer (or a lower layer) to a lower layer (or a higher layer). Information or signals described in the present disclosure may be input and output through a plurality of network nodes.

Information or the like that is input and output may be stored in a specific place (for example, a memory) or may be managed using a management table. The information or the like that is input and output can be overwritten, updated, or added. The information or the like that is output may be deleted. The information or the like that is input may be transmitted to another device.

The judging in the present disclosure may be performed based on a value expressed by 1 bit (0 or 1), may be performed based on Boolean (true or false), or may be performed by numerical value comparison (for example, comparison with a predetermined value).

Software, regardless of whether this is called software, firmware, middleware, microcode, a hardware description language, or any other name, should be interpreted broadly to mean instructions, instruction sets, codes, code segments, program codes, programs, subprograms, software modules, applications, software applications, software packages, routines, subroutines, objects, executable files, execution threads, procedures, functions, and the like.

In addition, software, instructions, information, and the like may be transmitted and received through a transmission medium. For example, in a case where software is transmitted from a website, a server, or other remote sources using at least one of the wired technology (coaxial cable, optical fiber cable, twisted pair, digital subscriber line (DSL), and the like) and the wireless technology (infrared, microwave, and the like), at least one of the wired technology and the wireless technology is included within the definition of the transmission medium.

The information, signals, and the like described in this disclosure may be expressed using any of a variety of different technologies. For example, data, instructions, commands, information, signals, bits, symbols, and chips that can be referred to throughout the above description may be represented by voltage, current, electromagnetic waves, magnetic field or magnetic particles, light field or photon, or any combination thereof.

In addition, the terms described in the present disclosure and the terms necessary for understanding the present disclosure may be replaced with terms having the same or similar meaning. For example, at least one of the channel and the symbol may be a signal (signaling). In addition, the signal may be a message. In addition, a component carrier (CC) may be called a carrier frequency, a cell, a frequency carrier, or the like.

The terms "system" and "network" used in this disclosure are used interchangeably.

In addition, the information, parameters, and the like described in the present disclosure may be expressed using an absolute value, may be expressed using a relative value from a predetermined value, or may be expressed using another corresponding information. For example, the radio resource may be indicated by an index.

The names used for the parameters described above are not limiting names in any way. In addition, equations and the like using these parameters may be different from those explicitly disclosed in the present disclosure. Since various channels (for example, a PUCCH and a PDCCH) and information elements can be identified by any suitable names, various names allocated to these various channels and information elements are not limiting names in any way.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. The base station may also be referred to as terms, such as a macro cell, a small cell, a femto cell, and a pico cell.

The base station can include one or more (for example, three) cells. When the base station includes a plurality of cells, the entire coverage area of the base station can be divided into a plurality of smaller areas, and each of the smaller area can also provide a communication service using a base station subsystem (for example, a remote radio head (RRH). The term "cell" or "sector" refers to a part or the entirety of the coverage area of at least one of a base station and a base station subsystem that provides communication services in this coverage.

In the present disclosure, terms such as "mobile station (MS)", "user terminal", "user equipment (UE)", and "terminal" can be used interchangeably.

The mobile station may also be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms depending on those skilled in the art.

At least one of the base station and the mobile station may be called a transmitting device, a receiving device, a communication device, and the like. In addition, at least one of the base station and the mobile station may be a device mounted on a moving body, the moving body itself, and the like. The moving body may be a vehicle (for example, a car or an airplane), an unmanned moving body (for example, a drone or a self-driving car), or a robot (maned or unmanned). In addition, at least one of the base station and the mobile station necessarily includes a device that does not move during a communication operation. For example, at least one of the base station and the mobile station may be an Internet of Things (IoT) device, such as a sensor.

In addition, the base station in the present disclosure may be read as a user terminal. For example, each aspect/embodiment of the present disclosure may be applied to a configuration in which communication between a base station and a user terminal is replaced with communication between a plurality of pieces of user equipment 20 (which may be called, for example, Device-to-Device (D2D) or Vehicle-to-Everything (V2X)). In this case, the user equipment 20 may have the above-described function of the base station apparatus 10. In addition, terms such as "uplink" and "downlink" may be read as terms corresponding to terminal-to-terminal communication (for example, "side"). For example, an uplink channel, a downlink channel, and the like may be read as a side channel.

Similarly, the user terminal in the present disclosure may be read as a base station. In this case, the base station may have the above-described function of the user terminal.

The terms "determining" used in the present disclosure may involve a wide variety of operations. For example, "determining" can include considering judging, calculating, computing, processing, deriving, investigating, looking up (search, inquiry) (for example, looking up in a table, database, or another data structure), and ascertaining as "determining". In addition, "determining" can include considering receiving (for example, receiving information), transmitting (for example, transmitting information), input, output, accessing (for example, accessing data in a memory) as "determining". In addition, "determining" can include considering resolving, selecting, choosing, establishing, comparing, and the like as "determining". In other words, "determining" can include considering any operation as "determining". In addition, "determining" may be read as "assuming", "expecting", "considering", and the like.

The terms "connected" and "coupled" or variations thereof mean any direct or indirect connection or coupling between two or more elements, and can include a case where one or more intermediate elements are present between two elements "connected" or "coupled" to each other. The coupling or connection between elements may be physical, logical, or a combination thereof. For example, "connection" may be read as "access". When used in this disclosure, two elements can be considered to be "connected" or "coupled" to each other using at least one of one or more wires, cables, and printed electrical connections and using some non-limiting and non-comprehensive examples, such as electromagnetic energy having wavelengths in a radio frequency domain, a microwave domain, and a light (both visible and invisible) domain.

The reference signal may be abbreviated as RS (Reference Signal), and may be called Pilot according to the applied standard.

The description "based on" used in this disclosure does not mean "based only on" unless otherwise specified. In other words, the description "based on" means both "based only on" and "based at least on".

Any reference to elements using designations such as "first" and "second" used in the present disclosure does not generally limit the quantity or order of the elements. These designations can be used in the present disclosure as a convenient method for distinguishing between two or more elements. Therefore, references to first and second elements do not mean that only two elements can be adopted or that the first element should precede the second element in any way.

"Means" in the configuration of each device described above may be replaced with "unit", "circuit", "device", and the like.

When "include", "including", and variations thereof are used in the present disclosure, these terms are intended to be inclusive similarly to the term "comprising". In addition, the term "or" used in the present disclosure is intended not to be an exclusive-OR.

A radio frame may be configured by one or more frames in the time domain. Each of one or more frames in the time domain may be referred to as a subframe. In addition, the subframe may be configured by one or more slots in the time domain. The subframe may be a fixed time length (for example, 1 ms) that does not depend on numerology.

Numerology may be a communication parameter applied to at least one of transmission and reception of a certain signal or channel. Numerology may indicate at least one of, for example, subcarrier spacing (SCS), bandwidth, symbol length, cyclic prefix length, transmission time interval (TTI), the number of symbols per TTI, radio frame configuration, specific filtering processing performed in the frequency domain by the transceiver, and specific windowing processing performed in the time domain by the transceiver.

A slot may be configured by one or more symbols (Orthogonal Frequency Division Multiplexing (OFDM) symbol, Single Carrier Frequency Division Multiple Access (SC-FDMA) symbol, and the like) in the time domain. A slot may be a time unit based on numerology.

A slot may include multiple mini-slots. Each mini-slot may be configured by one or more symbols in the time domain. In addition, the mini-slot may be called a subslot. A mini-slot may be configured by a smaller number of symbols than that in a slot. A PDSCH (or a PUSCH) transmitted in time units larger than the mini-slot may be referred to as PDSCH (or PUSCH) mapping type A. A PDSCH (or a PUSCH) transmitted using a mini-slot may be referred to as PDSCH (or PUSCH) mapping type B.

Each of the radio frame, the subframe, the slot, the mini-slot, and the symbol indicates a time unit when transmitting a signal. The radio frame, the subframe, the slot, the mini-slot, and the symbol may have different names corresponding thereto.

For example, one subframe may be called a transmission time interval (TTI), a plurality of consecutive subframes may be called a TTI, and one slot or one mini-slot may be called a TTI. That is, at least one of the subframe and the TTI may be a subframe (1 ms) in the known LTE, a period (for example, 1 to 13 symbols) shorter than 1 ms, or a period longer than 1 ms. In addition, the unit indicating the TTI may be called a slot, a mini-slot, or the like, instead of a subframe.

Here, the TTI refers to, for example, a minimum time unit of scheduling in radio communication. For example, in the LTE system, the base station performs scheduling for allocating radio resources (frequency bandwidth, transmission power, and the like that can be used in each user equipment 20) to each user equipment 20 in TTI units. In addition, the definition of the TTI is not limited to this.

The TTI may be a transmission time unit, such as a channel-encoded data packet (transport block), a code block, and a code word, or may be a processing unit, such as scheduling and link adaptation. In addition, when a TTI is given, a time section (for example, the number of symbols) in which a transport block, a code block, a code word, and the like are actually mapped may be shorter than the TTI.

In addition, when one slot or one mini-slot is called a TTI, one or more TTIs (that is, one or more slots or one or more mini-slots) may be a minimum time unit for scheduling. In addition, the number of slots (the number of mini-slots) configuring the minimum time unit of the scheduling may be controlled.

A TTI having a time length of 1 ms may be called a normal TTI (TTI in LTE Rel. 8-12), a long TTI, a normal subframe, a long subframe, a slot, and the like. A TTI shorter than the normal TTI may be called a short TTI, a partial or fractional TTI, a short subframe, a mini-slot, a subslot, a slot, and the like.

In addition, a long TTI (for example, a normal TTI or a subframe) may be read as a TTI having a time length exceeding 1 ms, and a short TTI may be read as a TTI shorter than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of numerology, and may be, for example, 12. The number of subcarriers included in the RB may be determined based on numerology.

In addition, the time domain of the RB may include one or more symbols, and may be the length of one slot, one mini-slot, one subframe, or one TTI. One TTI, one subframe, and the like may each be configured by one or more resource blocks.

In addition, one or more RBs may be called a physical resource block (PRB: Physical RB), a sub-carrier group (SCG), a resource element group (REG), a PRB pair, an RB pair, and the like.

In addition, the resource block may be configured by one or more resource elements (REs). For example, one RE may be a radio resource area of one subcarrier and one symbol.

A bandwidth part (BWP) (which may be called a partial bandwidth or the like) may indicate a subset of consecutive common resource blocks (common RBs) for certain numerology in a certain carrier. Here, the common RB may be specified by an index of the RB with the common reference point of the carrier as a reference. The PRB may be defined by a certain BWP and numbered within the BWP.

The BWP may include a BWP for UL (UL BWP) and a BWP for DL (DL BWP). For the UE, one or more BWPs may be set in one carrier.

At least one of the set BWPs may be active, and it may not be assumed that the UE transmits and receives a predetermined signal/channel outside the active BWP. In addition, "cell", "carrier", and the like in the present disclosure may be read as "BWP".

The structures of the radio frame, the subframe, the slot, the mini-slot, and the symbol described above are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in the TTI, the symbol length, the cyclic prefix (CP) length, and the like can be changed in various ways.

In the present disclosure, in a case where articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

Each aspect/embodiment described in the present disclosure may be used alone, may be used in combination, or may be switched and used according to execution. In addition, the notification of predetermined information (for example, notification of "X") is not limited to being explicitly performed, and may be performed implicitly (for example, without the notification of the predetermined information).

In the present disclosure, the sidelink communication is an example of the direct communication between terminals. The SCI is an example of control information for direct communication between terminals. A slot is an example of a predetermined time domain.

While the present disclosure has been described in detail, it is apparent to those skilled in the art that the present disclosure is not limited to the embodiment described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

EXPLANATIONS OF LETTERS OR NUMERALS

10 BASE STATION APPARATUS
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver configured to receive, from a base station, configuration information for configuring a resource to be used for terminal-to-terminal direct communication beforehand, and control information for dynamically configuring the resource;
a processor configured to schedule, based on selecting between the configuration information and the control information, a first resource for retransmitting data of the terminal-to-terminal direct communication,
   wherein the selecting between the configuration information and the control information being based on a type of an identifier by which the control information is scrambled,
   wherein the processor determines whether to retransmit the data of the terminal-to-terminal direct communication based on a value in information indicating new data included in the control information,
   wherein, in response to the processor selecting the control information, the processor is configured to dynamically schedule the first resource for retransmitting data of the terminal-to-terminal direct communication using the control information, and
   wherein, in response to the processor selecting the configuration information, the processor is configured to schedule the first resource for retransmitting data of the terminal-to-terminal direct communication using the configuration information; and
a transmitter configured to retransmit data of the terminal-to-terminal direct communication by using the first resource scheduled for retransmitting data by the processor.

2. The terminal as claimed in claim 1,
wherein the processor activates or deactivates the configuration information based on the control information,
wherein the configuration information is a configured grant, and
wherein activating the configuration information allows the terminal to use the configuration information to schedule the first resource for retransmitting data of the terminal-to-terminal direct communication and deactivating the configuration information does not allow the terminal to use the configuration information to schedule the first resource for retransmitting data of the terminal-to-terminal direct communication.

3. A communication system comprising:
a base station comprising:
   a transmitter configured to transmit, to a terminal, configuration information for configuring a resource to be used for terminal-to-terminal direct communication beforehand, and control information for dynamically configuring the resource; and
the terminal comprising:
   a receiver configured to receive, from the base station, the configuration information and the control information from the base station;
   a processor configured to schedule, based on selecting between the configuration information and the control information, a first resource for retransmitting data of the terminal-to-terminal direct communication,
      wherein the selecting between the configuration information and the control information being based on a type of an identifier by which the control information is scrambled,
      wherein the processor determines whether to retransmit the data of the terminal-to-terminal direct communication based on a value in information indicating new data included in the control information,
      wherein, in response to the processor selecting the control information, the processor is configured to dynamically schedule the first resource for retransmitting data of the terminal-to-terminal direct communication using the control information, and
      wherein, in response to the processor selecting the configuration information, the processor is configured to schedule the first resource for retransmitting data of the terminal-to-terminal direct communication using the configuration information; and
   a transmitter configured to retransmit data of the terminal-to-terminal direct communication to another terminal by using the first resource scheduled for retransmitting data by the processor.

4. A communication method of a terminal, comprising:
receiving, from a base station, configuration information for configuring a resource to be used for terminal-to-terminal direct communication beforehand, and control information for dynamically configuring the resource;
scheduling, based on selecting between the configuration information and the control information, a first resource for retransmitting data of the terminal-to-terminal direct communication,
   wherein the selecting between the configuration information and the control information being based on a type of an identifier by which the control information is scrambled,
   wherein the terminal determines whether to retransmit the data of the terminal-to-terminal direct communication based on a value in information indicating new data included in the control information,
   wherein, in response to the terminal selecting the control information, the terminal is configured to dynamically schedule the first resource for retransmitting data of the terminal-to-terminal direct communication using the control information, and
   wherein, in response to the terminal selecting the configuration information, the terminal is configured to schedule the first resource for retransmitting data of the terminal-to-terminal direct communication using the configuration information; and
retransmitting data of the terminal-to-terminal direct communication by using the first resource scheduled for retransmitting data.

* * * * *